(12) United States Patent
Stewart et al.

(10) Patent No.: US 6,259,405 B1
(45) Date of Patent: *Jul. 10, 2001

(54) GEOGRAPHIC BASED COMMUNICATIONS SERVICE

(75) Inventors: Brett B. Stewart; James Thompson, both of Austin, TX (US)

(73) Assignee: Wayport, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/433,817

(22) Filed: Nov. 3, 1999

Related U.S. Application Data

(63) Continuation-in-part of application No. 09/382,551, filed on Aug. 25, 1999, which is a continuation of application No. 09/186,131, filed on Nov. 4, 1998, now Pat. No. 5,969,678, which is a continuation of application No. 08/470,004, filed on Jun. 6, 1995, now Pat. No. 5,835,061.

(51) Int. Cl.[7] ............................................ G01S 3/02
(52) U.S. Cl. .................................... 342/457; 342/463
(58) Field of Search .................................. 342/450, 457, 342/463, 464; 701/207, 208

(56) References Cited

U.S. PATENT DOCUMENTS

| | | |
|---|---|---|
| 4,845,504 | 7/1989 | Robert et al. . |
| 5,095,532 | 3/1992 | Mardus . |
| 5,185,857 | 2/1993 | Rozmanith et al. . |
| 5,223,844 * | 6/1993 | Mansell et al. ............... 342/357 |
| 5,243,652 | 9/1993 | Teare et al. . |
| 5,365,516 | 11/1994 | Jandrell . |
| 5,432,841 | 7/1995 | Rimer . |
| 5,487,103 | 1/1996 | Richardson et al. . |
| 5,504,482 * | 4/1996 | Schreder ....................... 340/995 |
| 5,511,233 | 4/1996 | Otten . |

(List continued on next page.)

OTHER PUBLICATIONS

Bill N. Schilit and Marvin M. Theimer, *Disseminating Active Map Information Mobile Hosts*, IEEE Network, Sep./Oct. 1994.

(List continued on next page.)

*Primary Examiner*—Dao Phan
(74) *Attorney, Agent, or Firm*—Conley, Rose & Tayon, PC; Jeffrey C. Hood

(57) ABSTRACT

A geographic based communications service system that includes a network and a plurality of access points connected to the network and arranged at known locations in a geographic region. One or more service providers or information providers may be connected to the network to provide services or information on the network. A mobile user (MU) may use a portable computing device (PCD) to connect to the network and access information or services from the network. The PCD may be configured to transmit a signal indicating a presence of the PCD as well as identification information indicating the mobile user. Upon detection of the wireless signal by a first access point in proximity to the PCD, and upon receipt of the identification information indicating the user of the PCD, the first access point may transmit the identification information, as well as the known geographic location of the first access point, to one or more providers on the network. The known geographic location of the first access point indicates the approximate location of the PCD of the mobile user. A first information provider may receive this information and provide content information or services to the mobile user. For example, the first information provider may select content information dependent upon the known geographic location of the first access point and demographic information or past activities of the mobile user of the PCD. The first information provider may then provide the selected content information through the network and through the first access point to the PCD of the mobile user.

49 Claims, 23 Drawing Sheets

U.S. PATENT DOCUMENTS

| | | |
|---|---|---|
| 5,559,520 | 9/1996 | Barzegar et al. . |
| 5,627,549 * | 5/1997 | Park .................................... 342/357 |
| 5,636,245 | 6/1997 | Ernst et al. . |
| 5,646,632 | 7/1997 | Khan et al. . |
| 5,806,018 * | 9/1998 | Smith et al. ......................... 701/211 |
| 5,835,061 | 11/1998 | Stewart . |
| 5,969,678 | 10/1999 | Stewart . |
| 5,983,091 * | 11/1999 | Rodriguez ............................ 455/405 |

OTHER PUBLICATIONS

Andy Harter and Andy Hopper, *A Distributed Location System for the Active Office*, IEEE Network, Jan./Feb. 1994.

Max J. Egenhofer, *Spatial SQL: A Query and Presentation Language*, IEEE Network, Feb. 1994.

Mike Spreitzer and Marvin Theimer, *Providing Location Information in a Ubiquitous Computing Enviroment*, Proceedings of the Fourteenth ACM Symposium on Operating Systems Principles, Dec. 1993.

George W. Fitzmaurice, *Situated Information Spaces and Spatially Aware Palmtop Computers*, Communication of the ACM, Jul. 1993.

Ronald Azuma, *Tracking Requirements for Augmented Reality*, Communications of the ACM, vol. 36, No. 7, Jul. 1993.

Roy Want et al., *The Active Badge Location System*, ACM Transactions on Information Systems, vol. 10, No. 1, Jan. 1992.

Marvin White, *Emerging for Digital Maps for In–Vehicle Pathfinding and Other Taveller Assistance*, Vehicular Navigation & Information Systems Conference Proceedings, Part I, Oct. 1991.

Fred Phail, *The Power of a Personal Computer for Car Information and Communications Systems*, Vehicular Navigation & Information Systems Conference Proceedings, Part I, Oct. 1991.

Thomas A Dingus et al., *Human Factors Engineering the TravTek Driver Interface*, Vehicular Navigation & Information Systems Conference Proceedings, Part II, Oct. 1991.

Michel Muffat et al., *European Cooperation on Dual Mode Route Guidance Perspectives for Advanced Research Partners*, Vehicular Navigation & Information Systems Conference Proceedings, Part II, Oct. 1991.

* cited by examiner

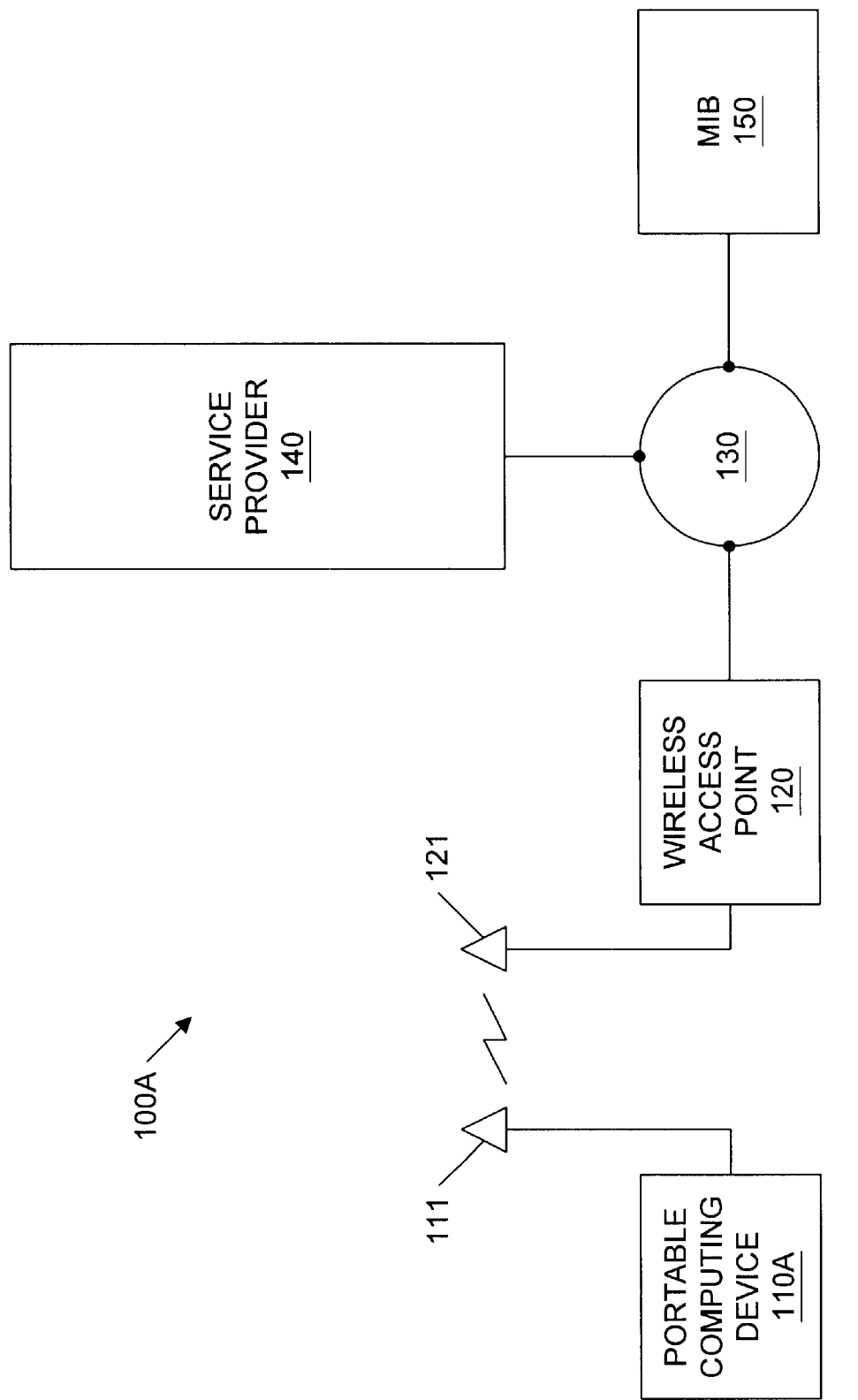

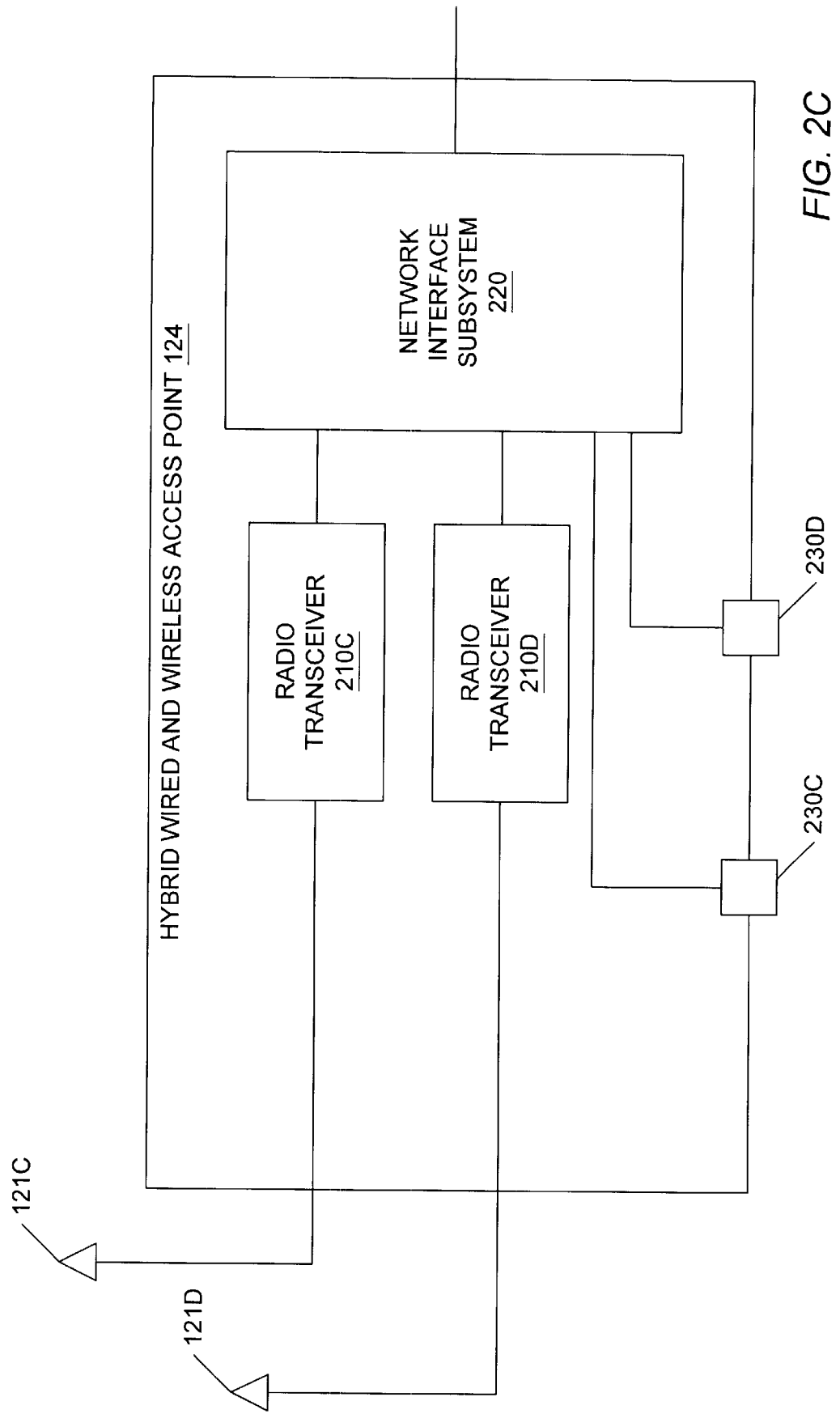

GEOGRAPHIC BASED COMMUNICATIONS SERVICE

CONTINUATION DATA

This application is a continuation-in-part of application Ser. No. 09/382,551 titled "Method and Apparatus for Geographic-Based Communications Service" filed on Aug. 25, 1999, which is a continuation of application Ser. No. 09/186,131 titled "System for Hybrid Wired and Wireless Geographic-Based Communications Service" filed on Nov. 4, 1998, which is now U.S. Pat. No. 5,969,678, which is a continuation of application Ser. No. 08/470,004 titled "Method and Apparatus for Geographic-Based Communications Service" filed on Jun. 6, 1995, which is now U.S. Pat. No. 5,835,061.

BACKGROUND OF THE INVENTION

1. Field of the Invention

The invention generally relates to a geographic based communications service and, more particularly, is concerned with an apparatus and method for using known locations of wired and wireless local area network access points (APs) to service mobile users of portable computing devices who are in the vicinity of the wired and wireless local area network APs.

2. Description of the Related Art

As technology improvements result in smaller, lighter and more portable computing devices (PCDs), a wide variety of new applications and users will emerge. Mobile users will not only operate such devices in stand alone mode, but will also desire the ability to send and receive information through such devices while at virtually any location. The need to communicate will arise in circumstances where hard-wired links may not be readily available or practical or when the mobile user cannot be reached immediately. Moreover, as a result of the user being mobile, the precise location of the PCD is often variable or not determined. As used herein, "MU" is an abbreviation for "mobile user of a portable computing device". Similarly, the plural, "MUs" is an abbreviation for "mobile users of portable computing devices".

Conventional communication systems for computing devices are not equipped to handle such communication scenarios. Commercially available PCDs are generally equipped with industry standard interface ports for driving a peripheral device such as a printer, a plotter, or a modem. While operating in an unknown, remote location not connected to a network, a MU may be unaware of messages waiting for him. In addition, conventionally, the MU may need to wait until reaching an office or other place with appropriate equipment to receive such messages and to transmit or print documents or other information prepared by the MU on his portable computing device.

By way of example and not limitation, one type of MU is the traveler who passes through airports or similar mass transit centers (e.g., subway commuters), uses ground transportation, and stays in a hotel. In a typical scenario, a traveler may use a portable computing device to perform calculations or prepare documents during an airplane flight. Simultaneously, associates may leave messages for the traveler on a network. In conventional systems, the traveler's work product and messages destined for the traveler are not available until the traveler arrives at a location where a wired connection to the traveler's network is available.

A further example of inefficiencies for the traveler concerns travel arrangements themselves. After arriving at an airport, the traveler proceeds to a car rental desk or to some other transportation location. The traveler typically waits in line while the car rental agency inquires about automobile preference, driver's license, method of payment, type of insurance required, etc. Having experienced some delay, the traveler is now on his way to a business location or hotel. Upon arriving at a hotel check-in/registration desk, the traveler often experiences further delay waiting in line and providing the check-in clerk with routine information such as address, length of stay, type of room desired, method of payment, etc. In addition, the traveler may need to call back to his office to check for voice-mail messages, thereby incurring further delays. While accessing databases for information about the traveler, where his preferences and requirements may reduce such delays, a common characteristic is that the pending arrival or presence of the traveler is not known to those who may act in advance. Further, conventional systems cannot generally locate a mobile user of a portable computing device and take advantage of that information to reduce the time required to complete routine activities or to provide the traveler options that may enhance the traveler's productivity.

In another example, when a user dials a telephone number to an automatic teller machine (ATM) locator, the user is prompted to key in his area code and exchange prefix. The locator system then identifies one or more ATMs within the user's area. However, the system requires the user to call in and cannot locate the user any more accurately than the telephone exchange area. Thus, the user may be advised of an ATM quite a physical distance from the user's location.

In addition, it is desirable to be able to provide information to a MU when the information is based on a location of the PCD within a geographic area. It is also desirable to provide information to a MU based on a geographic location of the PCD in combination with demographic information regarding the MU or past transactions of the MU.

SUMMARY OF THE INVENTION

In one embodiment, the present invention comprises a geographic based communications service system. The geographic-based communications service system includes a network and a plurality of access points connected to the network and arranged at known locations in a geographic region. One or more service providers or information providers may be connected to the network to provide services or information on the network. As used herein, the term "service provider" is intended to include goods providers, information providers, and/or service providers.

A mobile user (MU) may use a portable computing device (PCD) to connect to the network and access information or services from the network. The PCD of the mobile user may connect to an access point in a wired or wireless fashion. The PCD may be configured to transmit a signal indicating a presence of the PCD as well as identification information indicating the mobile user. Each of the plurality of access points may be configured to independently detect the signal and may also be configured to receive the identification information indicating the user of the PCD.

Upon detection of the wireless signal by a first access point in proximity to the PCD, and upon receipt of the identification information indicating the user of the PCD, the first access point may transmit the identification information, as well as the known geographic location of the first access point, to one or more providers on the network. The known geographic location of the first access point indicates the approximate location of the PCD of the mobile user. The first access point may also transmit the known geographic location to a memory associated with the PCD, thereby advising the PCD of its location.

A first information provider may receive this information and provide content information or services to the mobile user. For example, the first information provider may select content information dependent upon the known geographic location of the first access point and demographic information or past activities of the mobile user of the PCD. The first information provider may access the demographic information from a database on the network using the received identification information, or may receive the demographic information from the PCD of the mobile user. The demographic information or past activity information may include one or more of requirements, preferences, and habits of the user, or information extrapolated from the user's past practices which indicates probable future actions consistent with the past practices. The first information provider may then provide the selected content information through the network and through the first access point to the PCD of the mobile user.

Example information or service providers include rental car agencies, hotels, restaurants, airline reservation centers, banks, taxi services, bus and train reservation offices, printing services, on-line database services, message services, E-mail providers, advertising providers and other content providers. The providers may offer various types of information or services.

For example, the service provider may use the known geographic information to notify a rental car agency of the mobile user's presence and location as well as existing or desired rental car reservation information. The rental car agency may use this information, as well as the known geographic information of the mobile user, to make a reservation for the user, or begin processing the reservation so that the rental car is ready when the user arrives at the rental car counter.

In a similar manner, a hotel provider may receive the known geographic information of the mobile user as well as existing or desired hotel reservation information. The hotel may use this information, as well as the known geographic information of the mobile user, to make a reservation for the user, or begin processing the reservation so that the hotel is ready when the user arrives at the hotel.

A service provider may also use the known geographic information as well as received itinerary information to notify the MU of canceled flights and adjustments to the MU's itinerary, or to make travel reservations.

In addition, a service provider may also use the known geographic location as well as received demographic information to provide targeted geographic-based advertising to users. Thus the advertising content may be selected based on one or more of the known geographic location and the received demographic information. The service provider may also provide other geographic-based information to the mobile user.

The known geographic location may also be used to select a nearest service provider for the mobile user, such as the closest ATM or closest print destination. Further, because the geographic location of the MU is known, clocks and event schedules in the MU's PCD may be updated automatically to correspond to the present time in the time zone where the AP detecting the MU's PCD is located.

The geographic-based network may also provide data communication services. For example, when a MU passes a wireless access point, the access point recognizes the PCD, and the PCD may then retrieve data (e.g., voice-mail messages, e-mail messages, etc.) waiting for the MU and transmit information (e.g., e-mail messages, documents to be printed, requests for information from service providers, etc.) that the MU may have for transmission to a desired recipient. This process may occur as a MU exits an airplane and the PCD is detected by an access point in an airport. A MU may also connect their portable computing device to a wired AP to receive/transmit similar information.

In view of the above limitations of the related art, one aspect of the present invention includes the system in which a mobile user (MU) having a portable computing device (PCD) may be geographically located automatically. Preferably, the system automatically locates a MU with greater precision than is currently available.

Another aspect of the present invention includes a system and method that provides information or services to a MU based on a determined geographic location of the PCD and/or demographic information or past transaction information of the MU. Preferably, the system integrates portable computing devices with networks such that routine tasks, such as travel routing, and hotel and rental car reservations may be accomplished more efficiently. This allows a Mu to employ their portable computing device more effectively and to utilize otherwise idle time, such as time spent waiting at a car rental desk, a hotel registration desk and the like.

Still another aspect of the present invention includes a system and method that provides geographic based advertising to a MU, wherein the advertisements provided are based or selected on known geographic locations of the PCD and/or past transaction data or demographic information of the MU.

In another aspect of the present invention, information and services may be provided by various providers connected to the network that are able to respond to unanticipated requests or which have acquired knowledge about the MU's requirements, preferences and habits over a period of time and have extrapolated information from the Mu's past practices for probable future actions.

BRIEF DESCRIPTION OF THE DRAWINGS

Other objects and advantages of the invention will become apparent upon reading the following detailed description and upon reference to the accompanying drawings in which:

FIG. 1A is a block diagram of one embodiment of a geographic based wireless communication system;

FIG. 2C is a block diagram of one embodiment of a hybrid (wired and wireless) Access Point (AP);

Figure 1B:
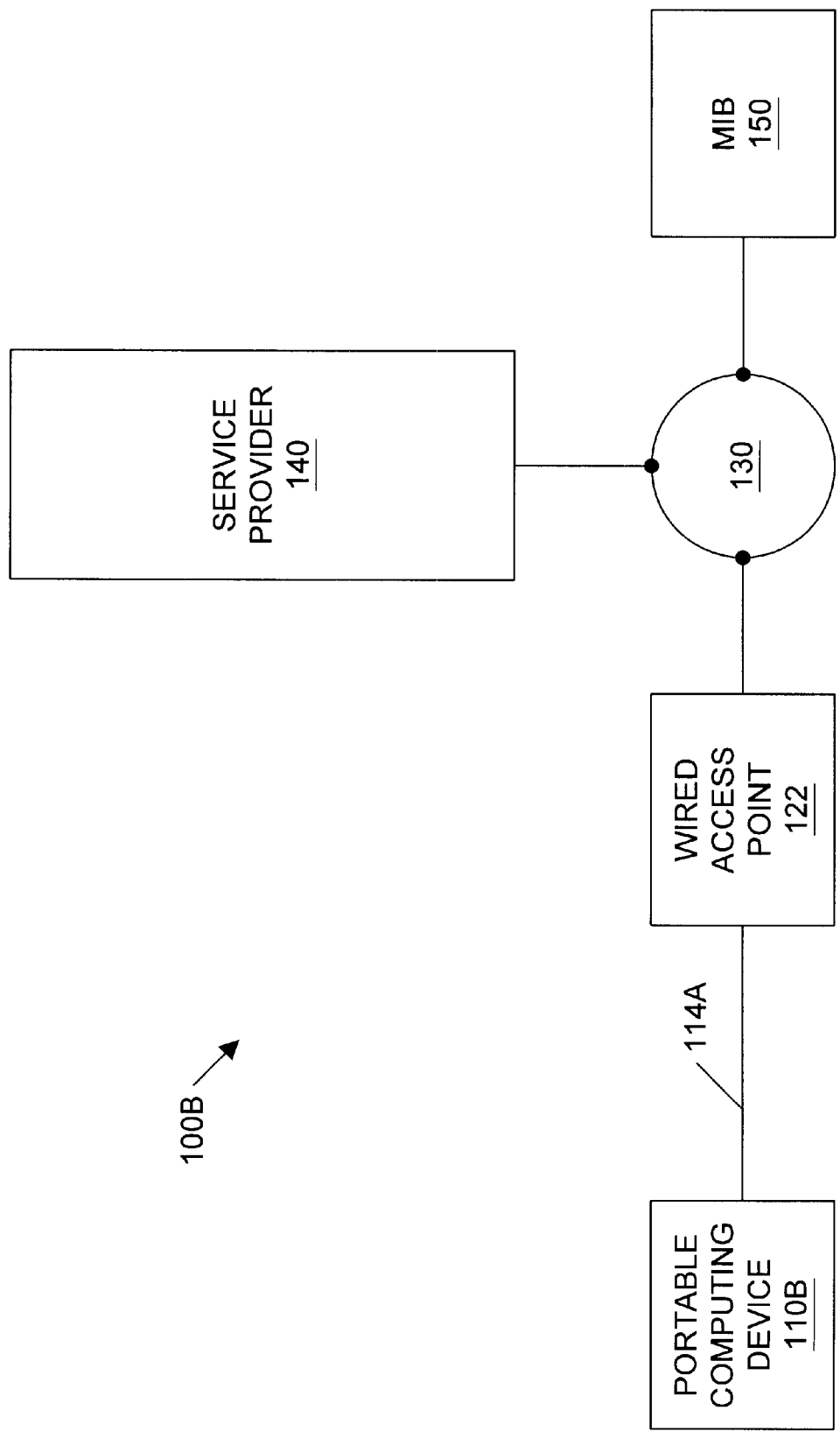
FIG. 1B is a block diagram of one embodiment of a geographic based wired communication system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1A: Geographic Based Wireless Communication System

FIG. 1A shows one embodiment of a geographic based wireless communication system or network 110A. The wireless communication system 100A may include a portable computing device (PCD) 110A with a wireless connection 111 (e.g., an antenna) in communication with a wireless access point (AP) 120 having a wireless connection 121 (e.g., an antenna). The AP 120 may be coupled to a service provider 140 and a management information base (MIB) 150 through a centralized network 130. The network 130 may comprise a wired network, a wireless network or a combination of wired and wireless networks.

The wireless communication system 100A may include a plurality of wireless access points 120, a plurality of service providers 140, and/or a plurality of MIBs 150. Access points (APs) for the network may be widely distributed in various facilities, such as airports, mass-transit stations, shopping malls, and other businesses, such as coffee shops or restaurants at an airport. When in sufficiently close range to an access point, the PCD 110A may access the network through, for example, a network card. In one embodiment, the APs 120 are arranged at known geographic locations and may provide geographic location information regarding the geographic location of the mobile user (MU) or the PCD 110A. In another embodiment, the PCD 110A may provide geographic location information of the PCD 110A through the AP 120 to the network 130. For example, the PCD 110A may include GPS (Global Positioning System) equipment to enable the PCD 110A to provide its geographic location through the AP 120 to the network 130, e.g., service provider 140 located on the network 130.

The service provider 140 and MIBs 150 each may comprise a computer system coupled to the network 130. The network 130 may comprise one or more wired or wireless local area networks and/or one or more wide area networks (e.g., the Internet). Each service provider 140 may include one or more computers or computer systems configured to provide goods, information, and/or services as appropriate for the service provider. One or more service providers 140 may be coupled to network 130 in a ring-network configuration, a star-network configuration, or other type of connection known in the art. The one or more service providers 140 may also connect to network 130 in a wireless fashion. The one or more MIBs 150 may be comprised in one or more service providers 140.

The wireless communication may be accomplished in a number of ways. In a preferred embodiment, PCD 110A and wireless AP 120 are both equipped with an appropriate transmitter and receiver compatible in power and frequency range (e.g., 2.4 GHz) to establish a wireless communication link (e.g., wireless connection 111 and wireless connection 121, respectively). For example, PCD 110A may include a wireless Ethernet card for communicating with APs 120. Wireless communication may also be accomplished through cellular, digital, or infrared communication technologies, among others. To provide user identification and/or ensure security, the MU may also be equipped with a code generator that generates an identification code that may be transmitted to and recognized by the wireless AP 120. This identification code may then be relayed to different service providers 140 and/or MIB 150 that are coupled to wireless AP 120 via centralized network 130. Such an identification code may utilize recognition of a MU before providing access to system services, thereby providing a measure of security and a service billing mechanism. The identification code may also identify the user to enable a service provider to use known information regarding the user or view demographic information in conjunction with the known geographic location to provide specific information (e.g., advertising) to the user.

FIG. 1B: Geographic Based Wired Communication System

FIG. 1B shows one embodiment of a geographic based wired communication system 100B. The system may include the same components as discussed in FIG. 1A with the following substitutions: PCD 110A is replaced with PCD 110B, wireless connections 111 and 121 are replaced with wired connection 114A, and wireless access point 120 is replaced with wired access point 122.

The wired connection 114A may be accomplished through a variety of different ports, connectors, and transmission mediums. For example, a laptop computer or PDA may be connected to the AP 120 through an Ethernet, USB, serial, or parallel transmission cables, among others. For example, a hotel may have Ethernet connections in its guest rooms as well as in hallways, restaurants, and shops. An airport Admiral's Club or airport terminals may also have wired connections for mobile users. A MU may connect to a wired access point 122 through the use of a laptop computer (PCD 110B), an Ethernet network card, and a network cable. This connection may be used for the same purposes as a connection made to a wireless AP 120 as discussed above. In other words, a MU using PCD 110B is able to send and receive the same information to/from information and service providers as a MU using PCD 110A in the same geographic area.

Figure 1C:
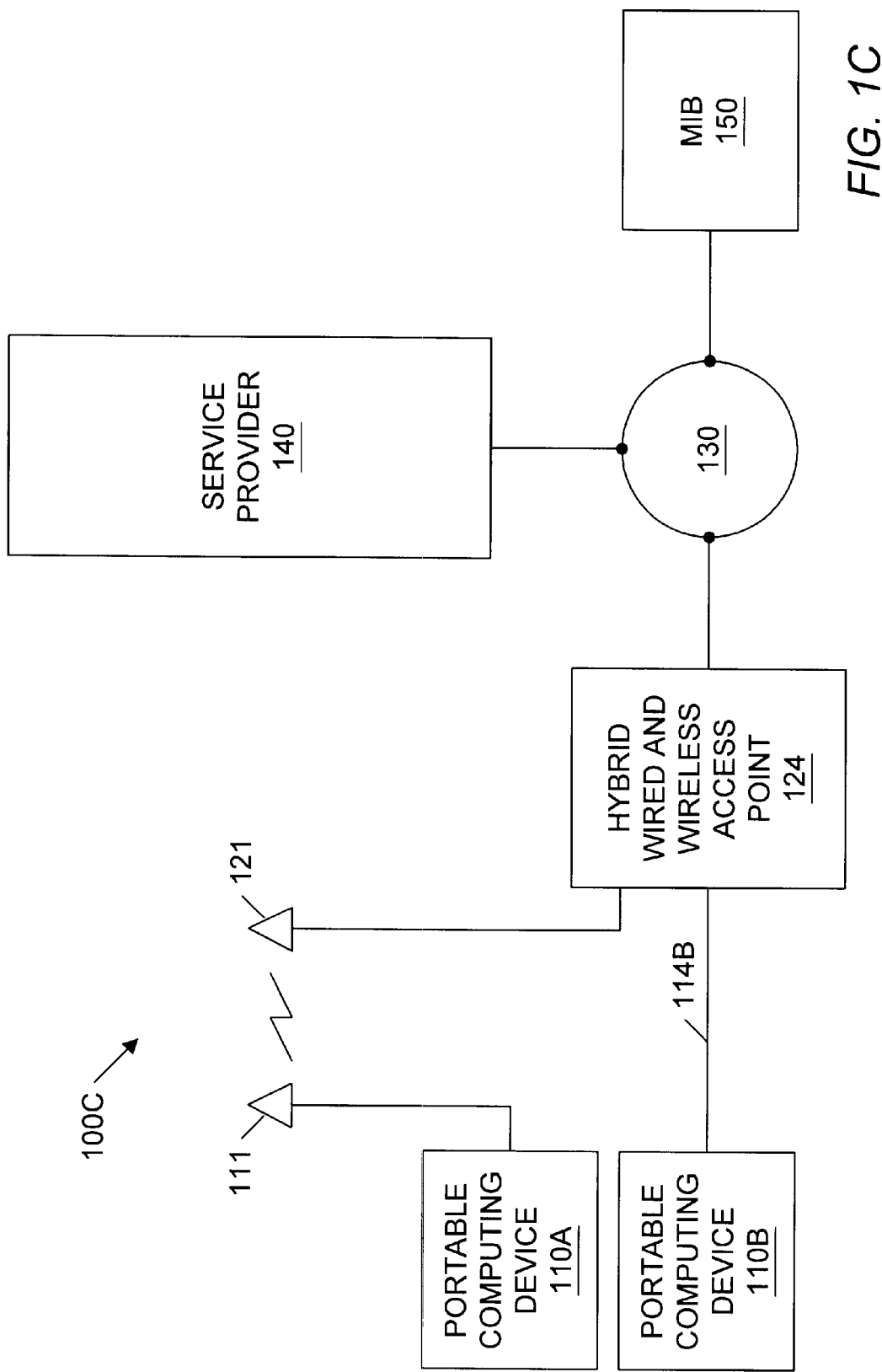
FIG. 1C is a block diagram of one embodiment of a geographic based hybrid (wired and wireless) communication system.

FIG. 1C: Geographic Based Hybrid (Wired and Wireless) Communication System

FIG. 1C shows one embodiment of a geographic based hybrid (wired and wireless) communication system 100C. The system may include the same components as discussed in both FIGS. 1A and 1B combined, with the following substitution: wireless access point 120 and wired access point 122 are replaced with hybrid wired and wireless access point 124. The embodiment of FIG. 1C allows either a wireless or a wired connection to be made between a MU's PCD and a hybrid wired and wireless AP 124: the MU would use PCD 110A for a wireless connection and PCD 110B for a wired connection.

The geographic-based communication service system may include various combinations of one or more wireless access points 120 and one or more wired access points 122, in addition to, or instead of the hybrid wired and wireless AP 124. Thus, some APs in the network may offer wired connections, while other access points in the network offer wireless connections, and yet others may be hybrid wired and wireless APs 124.

As described above with respect to FIG. 1A, a wireless communication may be accomplished in a number of ways. Also, the wired connection 114B may be accomplished in a number of ways, as described in FIG. 1B. Both connections (wired and wireless) may communicate in substantially the same manner as the other. In other words, a MU using PCD 110B is able to send and receive the same information to/from information and service providers as a MU using PCD 110A in the same geographic area.

Figure 2A:
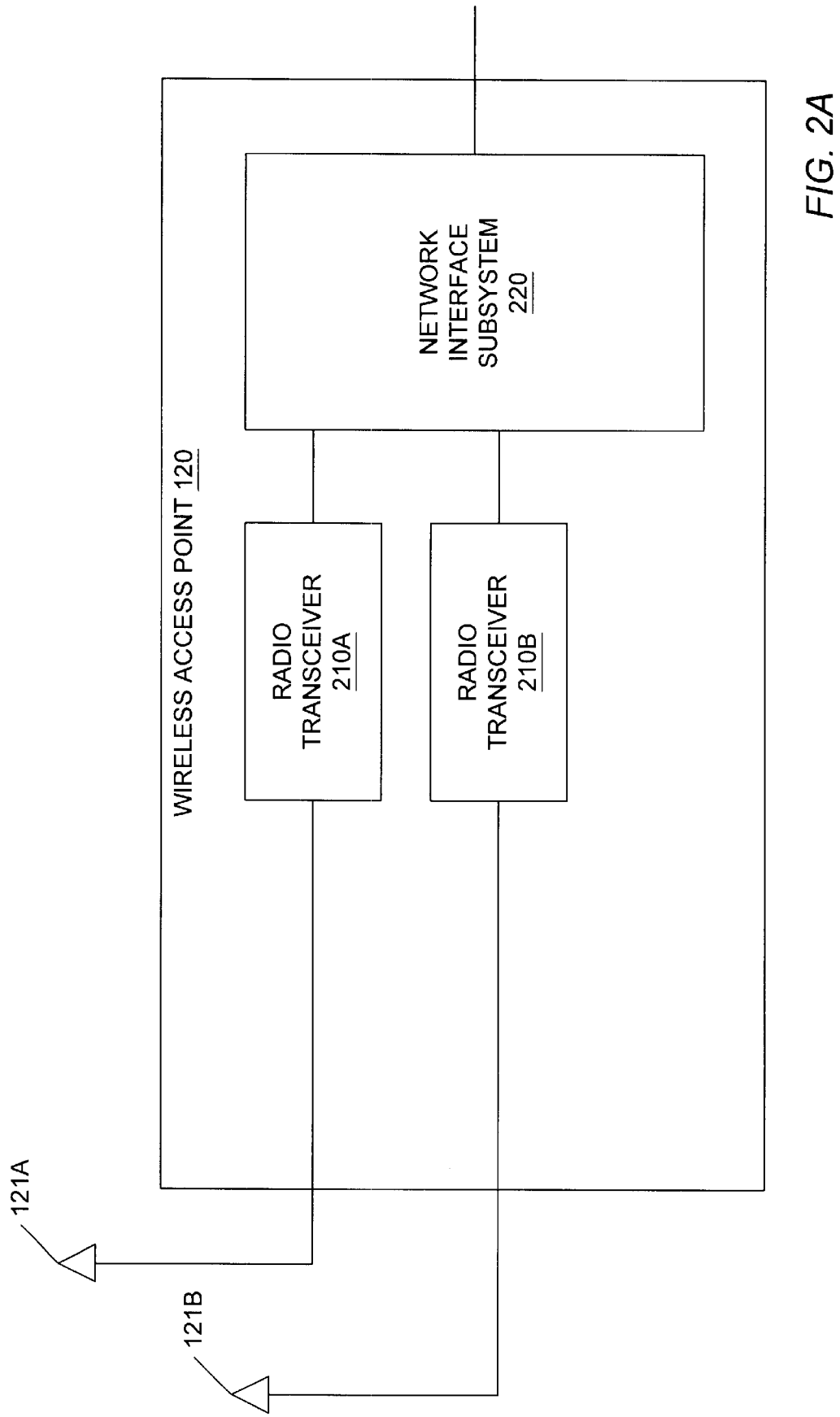
FIG. 2A is a block diagram of one embodiment of a wireless Access Point (AP)

FIG. 2A: Wireless Access Point

FIG. 2A is a block diagram of one embodiment of a wireless access point (AP) 120. The wireless AP 120 may comprise a network interface subsystem 220 coupled to radio transceiver 210A and radio transceiver 210B. Both radio transceiver 210A and radio transceiver 210B are coupled to antennas 121A and 121B, respectively.

A transceiver may be defined as an electrical component that comprises one or both of a transmitter and a receiver. For example, an Ethernet transceiver contains electronics that apply signals to the cable and sense incoming signals. In one embodiment of the present invention, radio transceiver 210A receives communications from PCD 110A and radio transceiver 210B transmits communications to PCD 110A. In another embodiment, radio transceiver 210A receives and transmits from/to a PCD 110A while radio transceiver 210B receives and transmits from/to a different PCD 110A. In either embodiment the transmitted information may contain security data or encoding that prevents others from receiving and decoding the transmitted data.

The network interface subsystem 220 may be configured to receive information from both service providers 140 and MIB 150 via centralized network 130. The network interface subsystem 220 may provide signals to the centralized network 130 over a wired connection or wireless connection. The network interface subsystem 220 may determine the proper radio transceiver (such as 210A or 210B), and may use a multiple access scheme to differentiate among users for transmitted and received data. For example, each PCD 110A may communicate with wireless AP 120 using a selected multiple access scheme such as CDMA, FDMA, or TDMA. When a wireless connection is initially made between a PCD 110A and wireless AP 120 parameters such as frequency, time slot and/or code of the wireless connection may be determined. This determination may be used to ensure that only a particular PCD 110A receives the transmitted data intended for that particular PCD 110A and that wireless AP 120 knows, when it receives data from a PCD 110A, which PCD 110A the received data is from. This may be important when there are multiple MUs concurrently communicating with one wireless AP 120.

The network interface subsystem 220 may also contain a memory. This memory may be used to store information specific to a particular wireless AP 120, such as geographic location of the wireless AP 120, a map of the local area, and an index of local services, e.g., local restaurants, hotels, etc. This memory allows an AP 120 to respond to many requests for information by a MU using PCD 110A, without requiring access to a service provider 140 or a MIB 150.

The antennas 121A and 121B may be any of a number of different antenna types. The type of antenna used may be specific to the type of wireless communication used. For example, if a particular wireless communication is accomplished through a high frequency radio wave, the antenna may be, among others, a yagi, cardiod, collinear, parabolic, or radome antenna. If the wireless communication is accomplished through infrared, the antenna may be a sensor panel that is sensitive to infrared light. The antenna that is used may have an impact on the area that a particular wireless AP 120 may service. For example, a small antenna may be able to communicate only with a MU using PCD 110A within a radius of five feet, while a larger and/or more powerful antenna may be able to communicate with MUs using PCD 110A throughout an entire building.

Figure 2B:
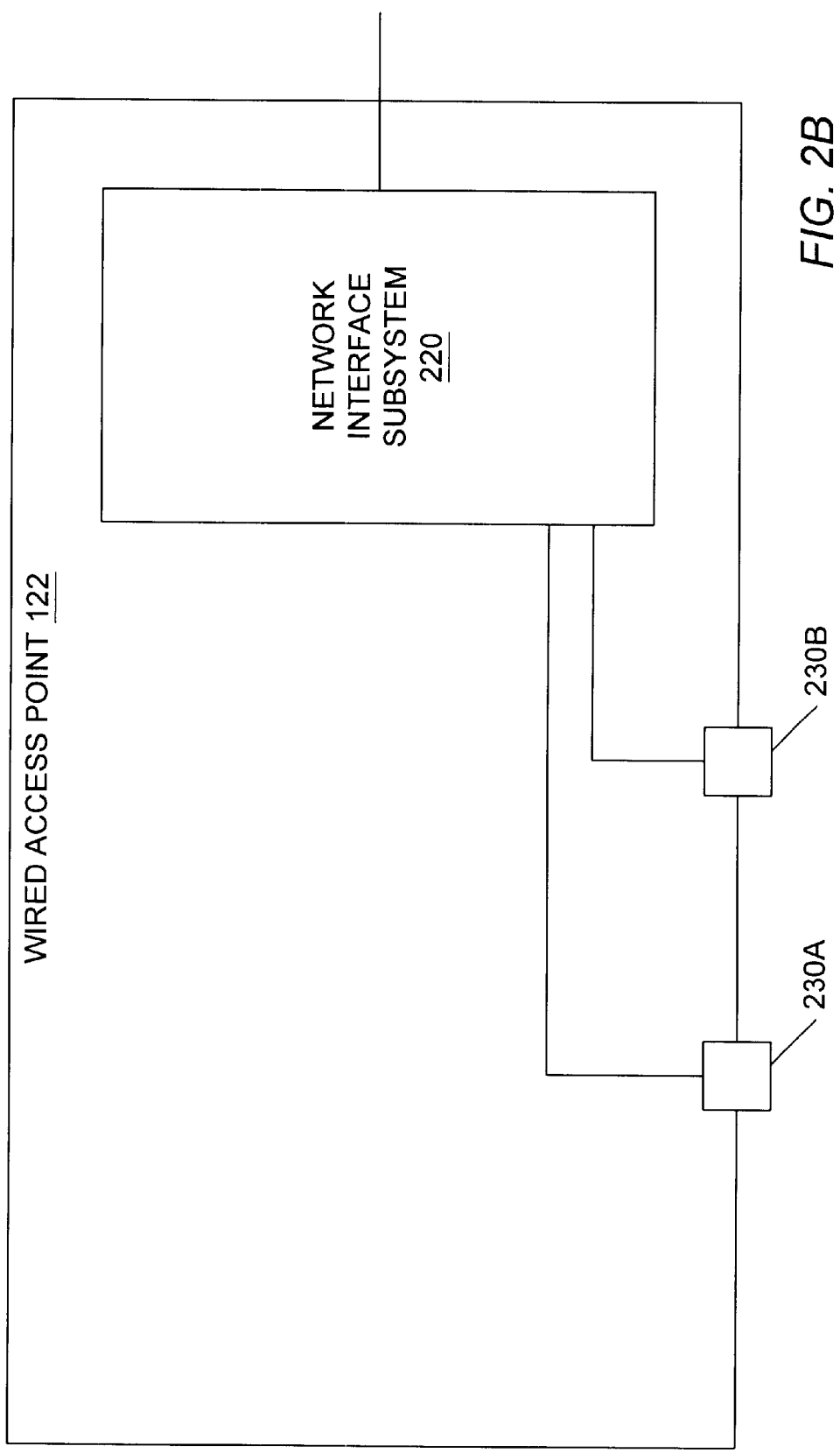
FIG. 2B is a block diagram of one embodiment of a wired Access Point (AP)

FIG. 2B: Wired Access Point

FIG. 2B is a block diagram of one embodiment of a wired access point (AP) 122. The wired AP 122 may comprise a network interface subsystem 220 coupled to input/output data ports 230A and 230B.

Wired AP 122 may accomplish substantially the same results as wireless AP 120, but through a physical (wired) connection between PCD 110B and wired AP 122. One function of a network interface subsystem 220 may be to route communications between the network 130 and each port which may be used by a PCD 110B. For example, a network interface subsystem 220 may have 20 input/output data ports 230 for allowing 20 simultaneous accesses by mobile users with PCDs 110B. A MU using PCD 110B and wired AP 122 may communicate through a particular data port 230, independent of another MU using another PCD 110B on a different data port 230. Furthermore, data that is transmitted through data ports 230 may be encoded so that only the appropriate MU using a particular PCD 110B may decode the data.

The data ports 230 may be any of a number of data ports. Data ports that are commonly used for wired communication include Ethernet, USB, IEEE 1394, serial, and parallel, among others. A particular wired AP 122 may comprise a variety of different types of data ports. For example, a wired AP 122 may comprise twelve data ports: five Ethernet ports, five USB ports, and two serial ports.

In one embodiment, the wired AP 122 includes one or more internal modems, such as described in co-pending U.S. patent application Ser. No. 09/304,138, hereby incorporated by reference in its entirety. Thus, a data port 230 coupled to the internal modem may allow for a MU using a PCD 110B with a modem to connect to the AP 122 at a maximum or guaranteed transfer rate.

FIG. 2C: Hybrid (Wired and Wireless) Access Point

FIG. 2C is a block diagram of one embodiment of a hybrid wired and wireless access point (AP) 124. The hybrid wired and wireless AP 124 comprises a network interface subsystem 220 coupled to input/output data ports 230C and 230D and also coupled to radio transceivers 210C and 210D. Both radio transceiver 210C and radio transceiver 210D are coupled to antennas 121C and 121D, respectively.

The network interface subsystem 220 controls what is sent/received to/from radio transceivers 210C and 210D as well as data ports 230C and 230D. The hybrid wired and wireless AP 124 allows both MUs using PCD 110Bs (wired) and MUs using PCD 110As (wireless) access to the same network interface subsystem 220. This may be accomplished through any combination of wired and wireless data ports as discussed above. For example, a hybrid wired and wireless access point 124 may comprise an Ethernet data port, a USB data port, a high frequency radio transceiver, and an infrared transceiver.

Network 130

The network 130 is preferably the Internet. Network 130 may include or be connected to other types of communications networks, (e.g., other than the Internet) such as the public switched telephone network (PSTN). Thus a MU using PCD 110B may send and receive information from/to the PSTN or other communication network through a service provider. The network 130 may also include or be coupled to another wide area network 130, such as a proprietary WAN. A connection may be made, for example, by the MU using PCD 110B dialing a service provider 140 using a modem connected to a phone whose geographic location is known, e.g., the geographic location of the phone has been entered into a database (e.g., MIB 150), which can be cross-referenced by a service provider. The service provider 140 may employ processors and other apparatus to convert protocols and data formats from those used on the network 130 to those compatible with the PSTN or other communication network. For example, the user may receive facsimile information from a PSTN connected to the network 130.

Figure 3A:
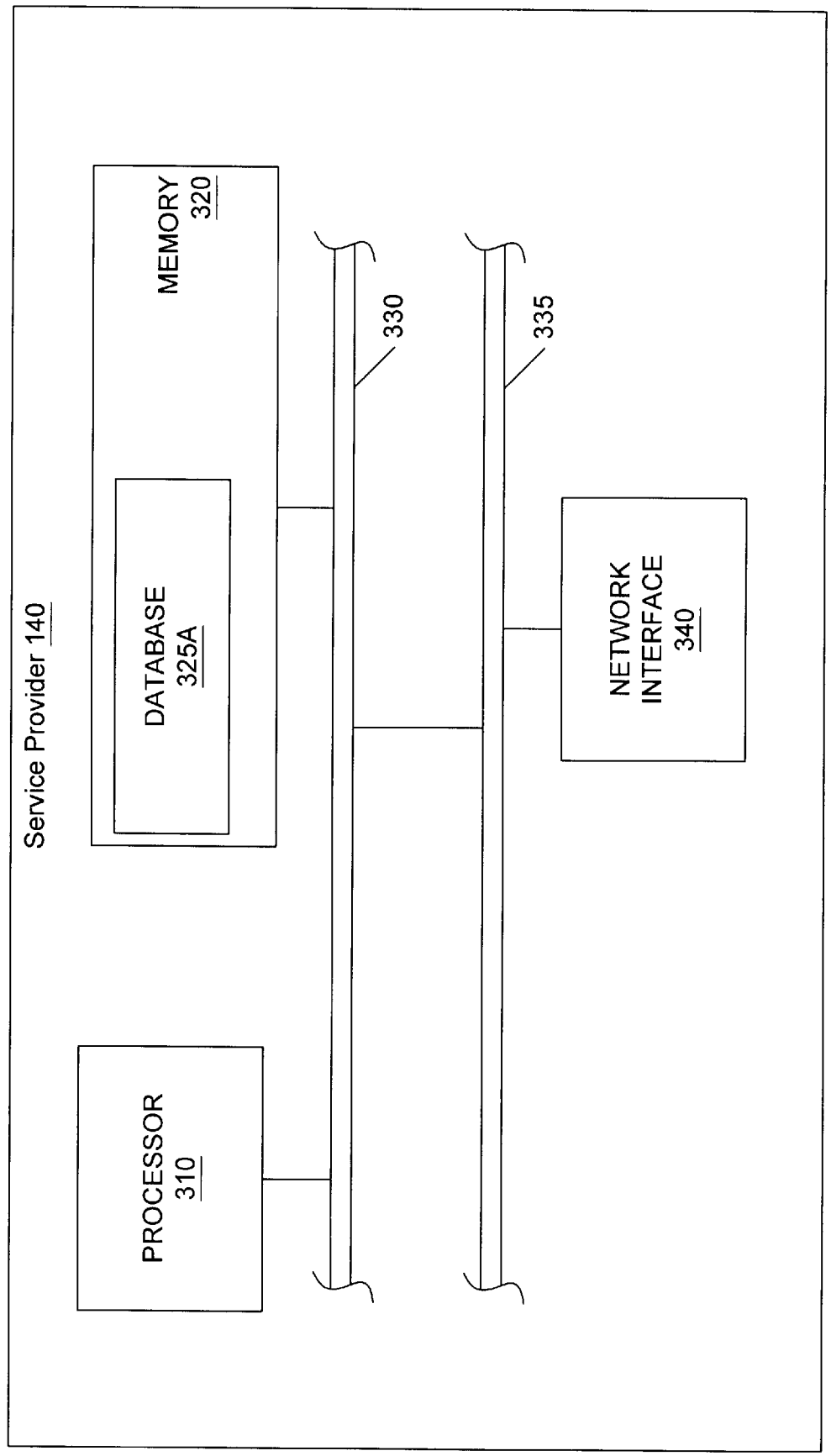
FIG. 3A is a block diagram of one embodiment of a computer system of a Service Provider.

FIG. 3A: Service Provider

FIG. 3A is a block diagram of one embodiment of a service provider computer 140, also referred to simply as a service provider. The system of FIG. 3A is exemplary only. The service provider 140 comprises a processor 310 coupled to a system bus 330. A database 325A and memory 320 may also be coupled to the system bus 330. System bus 330 is coupled to I/O bus 335. Network interface 340 is also coupled to I/O bus 335.

System bus 330 and I/O bus 335 may be coupled to other devices. For example, I/O bus 335 may be couple to a display that indicates to a system administrator the number of MUs currently connected to a particular AP.

Processor 310 may be any of several different processors. Processor 310 is operable to receive information requests from network 130, to determine what information fulfills each request, and to make the information available to the network 130 through network interface 340. Processor 310 also control devices coupled to the system bus 330 and I/O bus 335.

The database 325A may include various types of information, such as demographic information of users, or other information. The database 325A may store user specific information relative to a specific MU or a groups of MUs. In the present disclosure, the term "demographic information" of a user is intended to include, but is not limited to, information such as: full name, address, contact information such as telephone number and email address, daily schedule, family members, hobbies, past purchases, spending habits, buying preferences, hotel preferences, restaurant preferences, rental car preferences, banking habits, memberships (e.g., American Airlines Advantage Program, Herts Number One Club Gold), associations, and other information. The term "past activities" may be used synonymously with the term "demographic information".

Figure 3B:
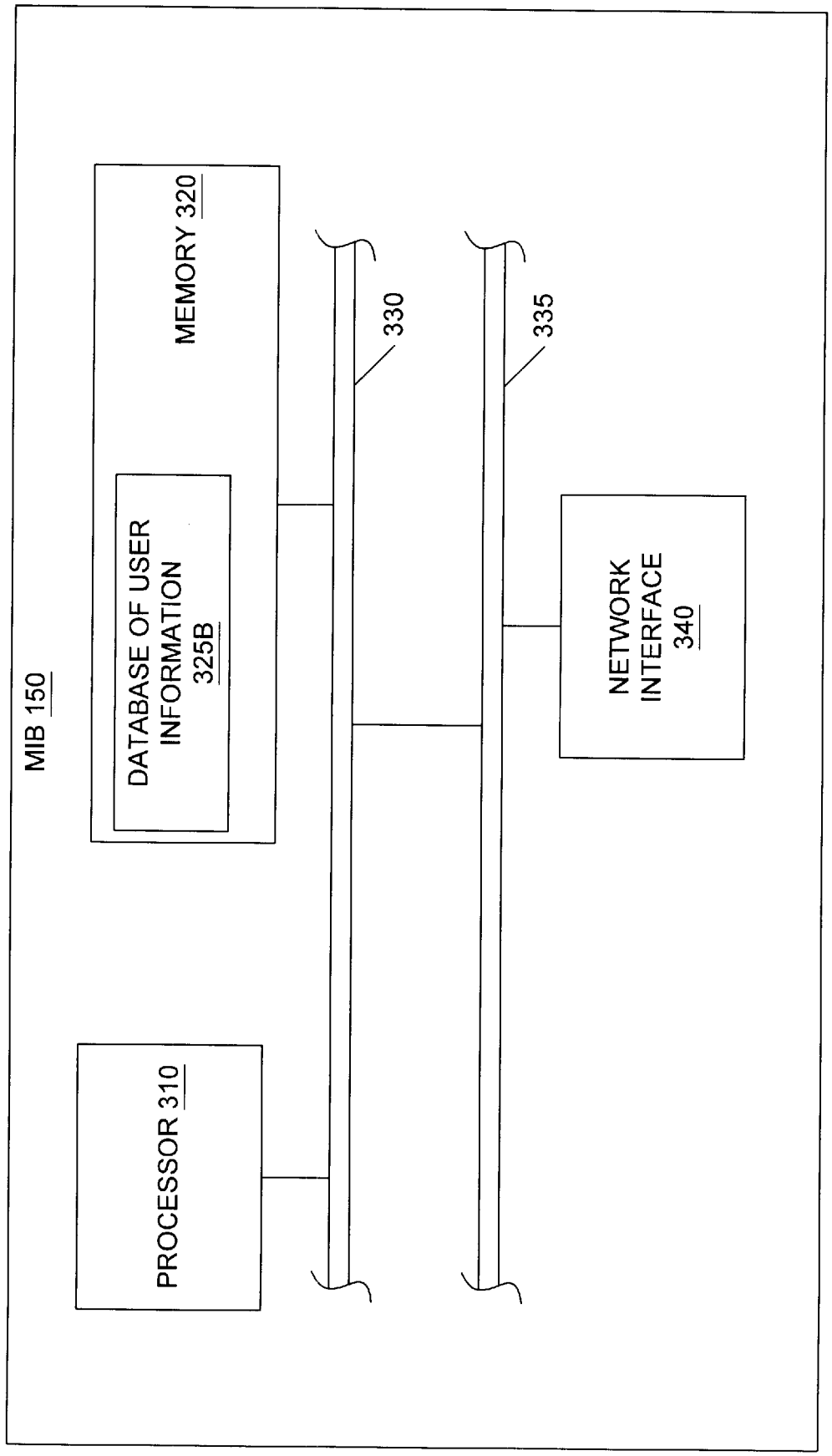
FIG. 3B is a block diagram of one embodiment of a Management Information Base (MIB)

FIG. 3B: Management Information Base (MIB)

FIG. 3B is one embodiment of a block diagram of a management information base 150 (MIB). The system of FIG. 3B is exemplary only. The MIB 150 comprises a processor 310 coupled to a system bus 330. A database of user information 325B and memory 320 may also be coupled to the system bus 330. System bus 330 is coupled to I/O bus 335. Network interface 340 is also coupled to IO bus 335. It is noted that the descriptions of System bus 330, I/O bus 335, and Processor 310 in FIG. 3A may also apply to FIG. 3B.

The MIB 150 may be a mechanism, such as a memory, which allows the persistent storage and management of information needed by network 130 to operate. Examples of such information include a directory of all the elements (e.g., APs, PCDs, etc) in the network, the topology of the network, characteristics of individual network elements, characteristics of connection links, performance and trend statistics, and any information which is of interest in the operation of the network 130. For example, the MIB may store the precise longitude, latitude, altitude and other geographic information pinpointing the location of each access point.

The MIB 150 may also store demographic information information relative to a specific MU or a groups of MUs as described above.

In order to reduce message traffic over the network, all or part of MIB 150 may be stored at one or more access points. In particular, static information that does not change, or changes relatively infrequently, may be stored at each access point. For example, a hybrid wired and wireless AP 124 may store the geographic location of the hybrid wired and wireless AP 124, the local map, local services and other information, such that routine requests for information from PCDs, such as "Where am I?" need not be serviced over the network, leaving more resources for other message traffic.

The user demographic information stored in database 325A or MIB 150 may only be available to registered network users using an access code that has been approved by the MU. Alternatively, the database 325A or MIB 150 may selectively store demographic information based on a permission received from the respective user. This information may be selectively provided by the database 325A or MIB 150, possibly upon the approval of the MU. Thus the database 325A or MIB 150 may act as an infomediary for MUs. For more information on the role of infomediaries in electronic commerce, please see the book titled "Net Worth" by John Hagel, Marc Singer, which is hereby incorporated by reference as though fully and completely set forth herein. In another embodiment, the database 325A or MIB 150 does not store demographic information received from a user, but rather this information is stored only on the user's PCD and thus is entirely within the user's control.

Portable Computing Device

The portable computing device 110A or 110B (referred to generally as PCD 110) may be any of various types of devices, including a computer system, such as a portable computer, a personal digital assistant (PDA), an Internet appliance, a communications device, such as a cellular phone, digital wireless telephone, or other wired or wireless device. The PCD 110 is designed to communicate with an access point 120, 122, or 124 (referred to generally as AP 120). The PCD 110 may include a memory which stores information regarding desired information or services. The memory may also store demographic information of the user.

In the present disclosure, the term "demographic information" of a user is intended to include, but is not limited to, information such as: full name, address, contact information such as telephone number and email address, daily schedule, family members, hobbies, past purchases, spending habits, buying preferences, hotel preferences, restaurant preferences, rental car preferences, banking habits, memberships (e.g., American Airlines Advantage Program, Herts Number One Club Gold), associations, and other information. The term "past activities" may be used synonymously with the term "demographic information".

Figure 4:
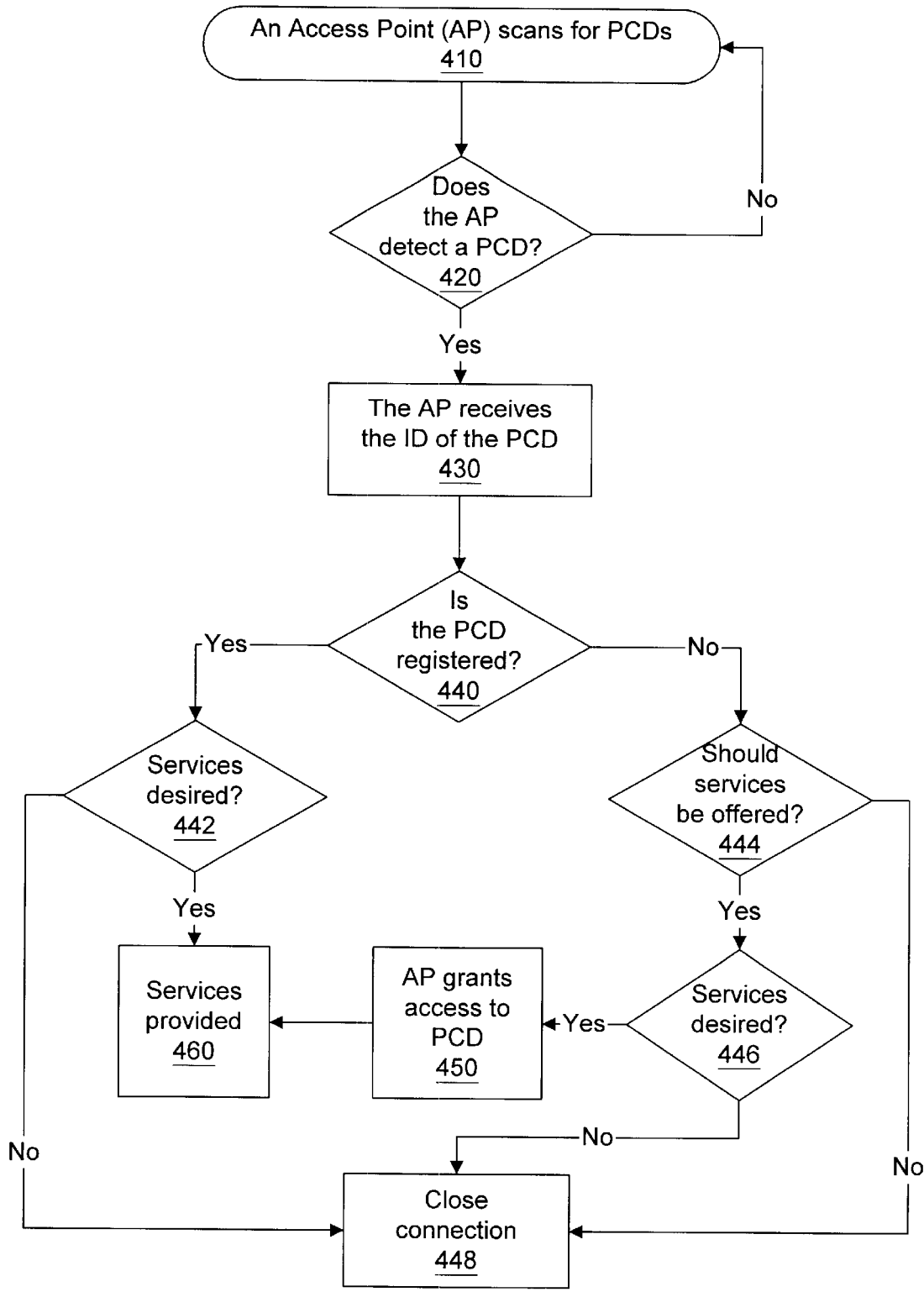
FIG. 4 is a flowchart illustrating one embodiment of operation of an access point of a geographic based communication system.

FIG. 4: Operation of a Geographic Based Communication System

FIG. 4 is a flowchart illustrating one embodiment of operation of an access point of a geographic based communication system.

In step 410, the access point 120 (e.g., wireless AP 120, wired AP 122, or hybrid wired and wireless AP 124) optionally scans for PCDs 110 (e.g., wireless AP 120 scans for PCD 110As, wired AP 122 scans for PCD 110Bs, hybrid wired and wireless AP 124 scans for PCDs 110A and/or PCDs 110B). For example, the AP 120 may be configured to receive signals from a PCD 110.

In a system comprising only wireless APs 120, the system may systematically scan a frequency and power range (e.g., 2.4 GHz) in search of recognizable wireless signals from PCD 110Bs within the geographic proximity of each wireless AP 120. The term 'geographic proximity' is used generally to describe the operable range of a wireless AP 120 (e.g., the distance a wireless signal may reliably be transmitted/received). For example, a particular wireless AP 120 may be able to scan all recognizable frequencies every 100 milliseconds. A mobile user (e.g., a MU using a particular PCD 110) may configure his PCD 110 to transmit a beacon signal with duration of 500 milliseconds every 3 seconds. Hence, as soon as the mobile user is within range of the wireless AP 120, a connection may be established. Alternatively, the mobile user may configure his PCD 110B to transmit a beacon signal only when instructed by the user.

In another embodiment, a wireless AP 120 may send out a signal periodically that is recognizable by PCD 110, e.g., PDAs, laptop computers, or other mobile user devices. This signal may inform the PCD 110 that a wireless AP 120 is near and offer the MU using that PCD 110 access to the system.

According to the embodiment of FIG. 1A, wireless AP 120 and PCD 110A communicate in a wireless manner.

Thus, as a MU passes by a wireless AP 120, such as in an airport, shopping mall, or other location, the AP 120 detects the presence of the PCD 110A in a wireless manner. This typically involves the PCD 110A generating a wireless signal which is detected by the wireless AP 120 wherein the wireless AP 120, then determines the presence of the PCD 110A. The PCD 110A may also transmit identification information or other information.

In a system using only wired APs 122, the system may continually scan wired data ports 230 to determine if a PCD 110B is connected. Alternatively, the system may not scan wired data ports 230, but instead be configured to receive a signal asserted on a data port by a PCD 110B.

In a hybrid system comprising wired APs 122 and wireless APs 120 (alternatively, the hybrid system may also include hybrid wired and wireless APs 124, or may strictly include hybrid wired and wireless APs 124), the system may scan for PCDs 110A and PCDs 110B, and/or transmit a signal indicating the location of the AP.

Step 420 represents that the method continues scanning for PCDs 110 until one is detected. In one embodiment, the AP 120 may continue to scan for PCDs 110 even after a PCD 110 is detected in step 420. In other words, step 420 represents that an AP 120 detects a PCD 110.

In step 430 the AP 120 may receive ID information from the detected PCD 110. In one embodiment, the PCD 110 automatically transmits ID information when a connection is made. In another embodiment, the AP 120 may request ID information from the PCD 110. ID information may comprise an identity code. The ID information may in addition comprise various demographic information corresponding to the MU of the PCD 110. For example, the ID information may comprise one or more of a name of the mobile user and an identity code or password of the mobile user. The ID information may instead identify the PCD 110 instead of or in addition to the MU. In a preferred embodiment, an AP may identify a MU simply by receiving a single ID code from the MU's PCD 110. This code may be, for example, a 32-bit number that was assigned to the MU.

In step 440 the AP determines if the PCD 110 is registered with the system, (e.g., whether the ID code supplied by the PCD 110 is on a list of authorized IDs for the system). To determine if the MU is registered, the ID code may be sent to the MIB 150 via network 130. Processor 310 may query the database of user information 325B to determine if the ID code is registered. If the ID code is in the database of user information 325B, the processor 310 may then validate the user. The processor 310 may also optionally read other demographic information on the MU to determine if the MU is authorized to access the system. For example, a MU may be restricted from using certain APs depending on his/her account or subscription.

If the MU or PCD is registered as determined in step 440, then in step 442 the system may offers service to the registered MU. If services are desired by the MU, processing continues with step 460.

If the MU or PCD is not registered as determined in step 440, the in step 444 the method determines whether it should offer services to the non-registered MU. If the MU is not registered (e.g., the ID code is not found in the database of user information 325B) the system may still offer services to the MU. This determination may be as simple as a configuration flag that the operator of the AP has set prior to communication with the PCD. In such an embodiment, a flag may be set to 0 to indicate that the system should offer services to non-registered MUs and the flag may be set to 1 to indicate that the system should not offer services to non-registered MUs. As one example, the method may offer various free services to the non-registered mobile user, such as providing target advertising.

In another embodiment, in step 444 the method may be configured to dynamically determine whether non-registered MUs should be offered services. The determination may be based on factors such as current time, current communication traffic, number of active APs, credit history of the MU, or other demographic information of the MU, etc. The decision in step 444 may be made by the MIB or by each respective service provider. If access is denied (e.g., it is determined that services should not be offered to the non-registered MU), the method continues to step 448 where the connection to the AP is closed.

If the method determines that service is to be offered to non-registered MUs, the method continues to step 446 where the MU's PCD is queried as to whether the MU desires services from the AP. In one embodiment, a PCD 110 may be configured to automatically accept an offer of service. In this embodiment, a response to the query from the AP is instantly transmitted from the PCD 110, and the method continues to step 450. Alternatively, when a MU receives (on their PCD) an offer of services from an AP, the MU manually selects whether they desire a service and transmit an appropriate response to the AP.

In step 450 the MU that is not registered is authorized to access service providers 140. The MU may be given a temporary access ID that allows him/her to access only certain service providers 140. In addition, MUs with temporary access IDs may not receive broadcast transmissions (e.g., transmissions that are sent to every PCD) from service providers 140. Step 450 may alternatively include a method to allow a non-registered MU to register. This registration process may be automatic in some embodiments. For example, the AP may allow any MU to be registered without receiving demographic information from the MU. In one embodiment, in order to be registered (e.g., in order to have an ID number permanently stored in the database of user information 325B), a MU may need to enter certain demographic data. Demographic data may include name, address, telephone number, sex, age, marital status, hobbies, etc. Such data may be useful to service providers 140 to determine targeted advertising or other targeted services or information.

In step 460 the AP provides access to service providers 140. For wireless APs, the services may be offered while the MU is in the geographic proximity of the wireless AP. For wired APs, the services may be offered while the PCD is plugged in to a data port connected to the wired AP.

A variety of goods, information and service providers 140 may be accessible to registered MUs in step 460. A more limited list of goods, information and service providers 140 may be accessible to non-registered MUs granted temporary access to the system (e.g. via step 450). Service providers that may offer services through an AP may include: rental car agencies, hotels, restaurants, airline reservation centers, banks, taxi services, bus and train reservation offices, printing services, on-line database services, message services, E-mail providers, advertising providers and other content providers. Note that this list is not meant to limit the quantity or type of goods, information and/or service providers, but instead it is noted that the scope of possible goods, information and service providers is generally limitless.

Figure 5:
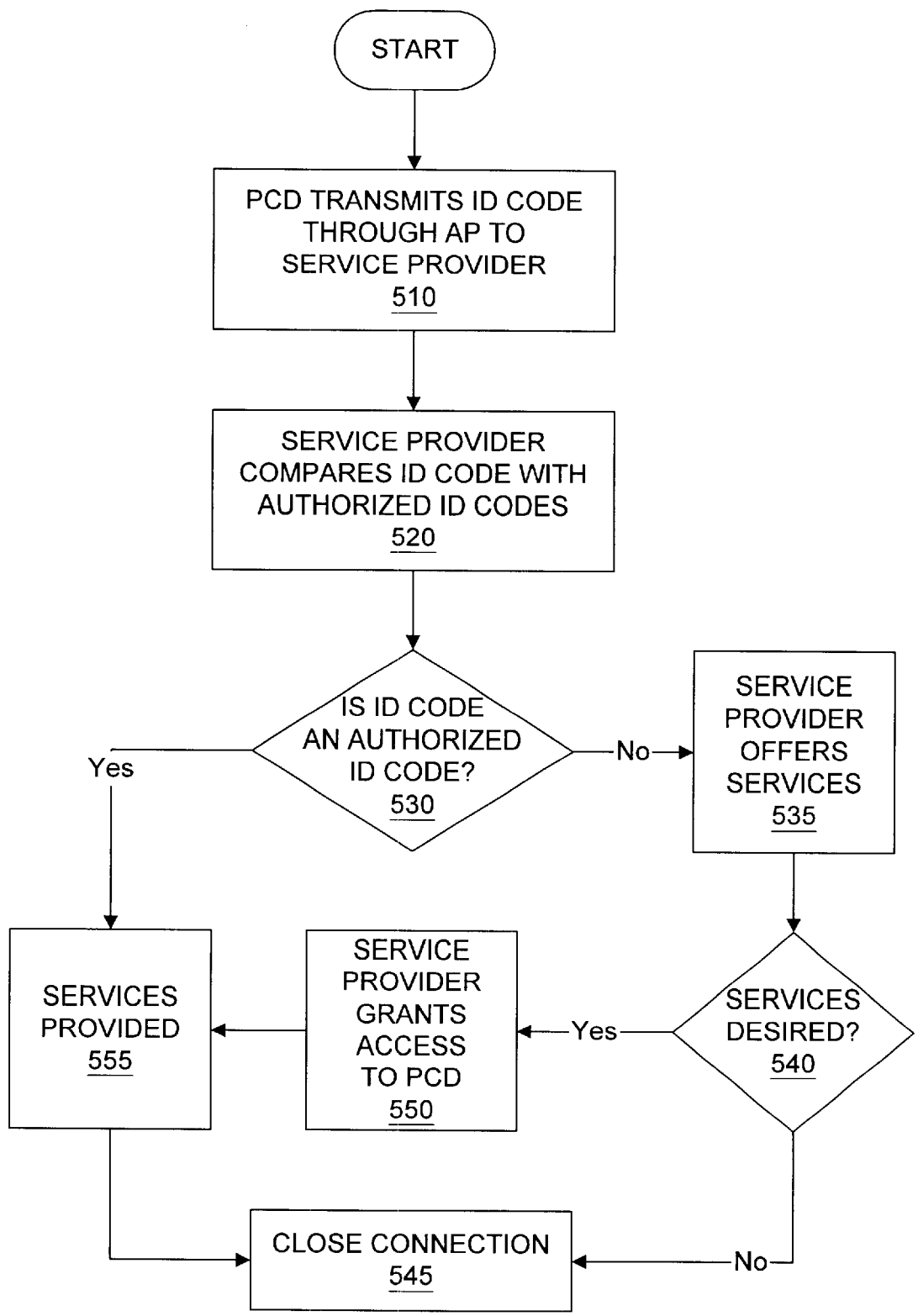
FIG. 5 is a flowchart illustrating one embodiment of an authorization process that a service provider may perform on individual MUs before granting access to service providers through a geographic based communication system.

FIG. 5: Service Provider Authorization Process

FIG. 5 is a flowchart illustrating one embodiment of an authorization process that an information or service provider 140 may perform on individual MUs before granting access to the particular information or service providers through a geographic based communication system.

In step 510 the ID of the PCD may be transmitted to a service provider. This information may be a single ID code, or in some systems may include demographic information.

In step 520 the service provider may access a membership database 325A to determine if the ID of the PCD matches an ID in the membership database 325A of the service provider. Additionally, there may be multiple levels of access to membership databases based on geographic location and/or demographic data. For example, a bank service provider may be connected to a nationwide banking network so a traveler may access banking information from any access point in the country. On the other hand, a taxi service provider may be localized and only provide information regarding taxi fares and availability for a particular city when the taxi fares are requested from access points located within that particular city.

In step 530 the service provider may determine if the MU is authorized to access the service provider. Some service providers may grant access to any MU, possibly upon submission of an ID code. For example, service providers which provide targeted advertising may provide this targeted advertising to all MUs. Other service providers may require a prior registration and/or a monetary fee before granting access. Additionally, there may be multiple levels of authorization based on geographic location. For example, a MU that performs banking through a service provider may not be allowed to transfer large amounts of money from his account unless his geographic location is secure. For example, if the MU is communicating through an AP in a hotel room, the MU may have limits on the types and amounts of transactions that may be accepted. This safeguard may reduce duress-induced transactions by requiring that transactions for large amounts be carried out in a secure location. If the connection is in a hotel lobby, instead of a hotel room, for example, the MU may have more privileges, but still less privileges than if he were geographically located in a bank lobby.

If the ID code is determined to not be authorized in step 530, then a service provider may optionally offer services to a MU that is not registered with the service provider. If the service provider chooses not to offer services to a MU that is not registered with the service provider, processing falls through step 540 to step 545, where the connection to the service provider is closed. In addition, if the service provider offers services, but the non-registered MU does not desire the offered services, the method continues to step 545 where the connection to the service provider is closed.

In step 540 if a non-registered MU desires services that are offered, the method continues to step 550. In step 550 a non-registered MU that desires services from a service provider may be authorized to access the service provider. The authorization process may be automatic, e.g., any MU may be granted instant access without providing personal demographic data, or the authorization process may require a MU to register with the service provider. If a service provider requires certain demographic data before access is granted, and if the MU is registered with the AP (e.g., demographic data is stored in the database of user information 325), in one embodiment the demographic data may be automatically provided to the service provider from the database of user information 325 in the MIB 150. In another embodiment, the MU may enter requested data in order to gain access to the service provider.

In step 555 a service provider provides services to the MU through an AP. A variety of information and service providers 140 are conceivable. Examples of information and service providers 140 include rental car agencies, hotels, restaurants, airline reservation centers, banks, taxi services, bus and train reservation offices, printing services, on-line database services, message services, E-mail providers, advertising providers, and other content providers. Information and service providers 140 may be networked with a nationwide database or may provide only local information. Examples of the services offered are described with respect to the flowcharts of FIGS. 6–14. After the services have been provided, the method continues to step 545 where the connection to the service provider is closed.

Multiple Geographic Based Communication Services from Different Providers

The system may include multiple geographic based communication services from different providers. For example, one geographic based communication service may be referred to as a WAYPORT network (WAYPORT is a Registered Trademark of Wayport, Inc. of Austin, Tex.). A WAYPORT network may be compatible with other types of similar geographic-based networks maintained by other companies. For example, if WAYPORT networks are installed in the Austin-Bergstrom International airport and similar 'XYZ' networks are installed in a hotel in downtown Austin, a MU that has subscribed to WAYPORT networks may be able to use the services offered at the downtown hotel by XYZ. More specifically, a MU that has registered with a WAYPORT network (e.g., has entered demographic data and agreed to pay transaction costs) may not need to register with XYZ. The MU may use other network providers (e.g., XYZ networks) and still only be billed from one company (e.g., the provider of the WAYPORT network with which the MU is registered). This may be accomplished through agreements established between different network providers.

For example, a WAYPORT network-registered MU connects to a XYZ network in the downtown hotel. The XYZ network notices from the PCD ID information that the MU is not registered on the XYZ network, but is registered on the WAYPORT network. The XYZ network may perform a verification of the PCD ID by querying a database of registered PCD IDs on the WAYPORT network. The XYZ network may acquire demographic information on the credentials of the MU. If the credentials of a MU are not acceptable, access to the XYZ network may be denied. If the credentials are acceptable, the XYZ network may grant the MU access to various goods, information and/or service providers. The XYZ network may inform the MU (via a message on the MU's PCD) that there is an additional cost for accessing the XYZ network as a nonregistered user. The MU may then have the choice of paying the additional fees for the services or disconnecting. In addition, the MU may have the option of registering with the XYZ network to avoid paying 'roaming' fees.

FIGS. 6–14: Embodiments of Geographic Based Communication System Usage

FIGS. 6 through 14 illustrate examples of embodiments of usage of the geographic based communication system. Geographic based communication systems may include systems similar to those shown above with respect to FIGS. 1A, 1B, and 1C. Access points 120, 122 or 124 (referred to generally as AP 120) referred to in the following examples may be similar to those shown above with respect to FIGS. 2A, 2B, and 2C.

For some service providers, access to a service provider generally may be first granted to a MU, e.g.. through the method of FIG. 5, before the methods described in these figures may be used. Once access is granted (e.g., the MU is registered), the various goods, information, and/or services provided by the various service providers are available to the MU through the use of their PCD and an access point. For other service providers, access may be provided to any MU regardless of or without any registration or identification process. For example, geographic-based advertising services may be provided to all MUs regardless of any authentification or registration.

Service providers 140 may include providers of a wide variety of goods, information, and/or services. Examples of service providers 140 include, but are not limited to, car rental agencies, hotels, restaurants, airline reservation centers, banks, department stores, malls, specialty shops, gift shops, convenience stores, taxi services, bus and train reservation offices, printing services, on-line database services, message services, E-mail providers, advertising providers, and other content providers. In addition, service providers may be designed to track, record, and predict eating, buying, spending, and other habits of a MU.

For example, upon learning that a MU is scheduling a trip to Austin, Tex., a service provider 140 may consider the previous trips by the MU, develop a suggested itinerary, and book travel, hotel, car and restaurant reservations. Service providers 140 thus may acquire knowledge about the habits of the MU over a period of time, store the information in a memory (such as in an MIB), and extrapolate information from past habits to predict future actions.

Service providers 140 may also provide information to other information and/or service providers. For example, an information provider may be designed to store information on eating habits of MUs. This data may be stored and analyzed in order to predict the choices each MU will make in the future. This information may be valuable to restaurants frequented by the MU, such as for targeted advertising. This information may also be valuable in areas that a MU visits infrequently or has never been to before. The restaurant may also receive general demographic information about the MU (e.g., age, sex, address, etc.) from the MIB 150. Specialized information may only be available through a specialized information provider. Similarly, a service provider 140 may gather information on the demographics of all the MUs registered in one or more of the MIBs 150. This information may instantly be gathered and charted to give an overall view of MUs according to geographic proximity to one or more access points. This information may comprise only the basic demographic data stored in one or more of the MIBs 150, or the information provider may query the respective MUs for additional information.

In a preferred embodiment, as mentioned above, each access point in the network, e.g., access points 120 may be associated with a unique geographic location that is useable by service providers 140 and/or an MIB 150. The geographic location of each access point may be stored in each respective access point 120 or in an MIB 150.

This specific geographic information about an access point 120 may be useful for service providers 140 (e.g., retail businesses) within the geographic proximity of the access point in order to send/receive information, such as advertising, or provide a service, to/from the MU's PCD, wherein the information may be selected and transmitted, or the service provided, based on the known geographic location of the MU. In one embodiment, each AP 120 may receive the same data from a respective network interface subsystem 220 and broadcast this data to all MUs. For example, if a particular AP is designed to provide MUs using PCDs 110 with a map of the local area, the respective network interface subsystem 220 may repeatedly send the local map to each data port 230 regardless of the identities of the attached PCDs 110. In one embodiment the AP may be configured to only provide this geographic-based information, and is not capable of providing MU-specific information. Alternatively, the AP may also be configured to provide this geographic information to all MUs as well as MU-specific or MU-dependent information.

Since the geographic location of each access point 120 is defined and known, such as by each respective MIB 150, detection of the presence of a PCD 110 by an access point allows a MIB 150 to know the approximate or exact location of the mobile user of PCD 110 at any given time. For example, the MIB 150 may store the latitude, longitude, altitude, and other geographic information such as a local map of the area of each access point 120. The precision available in this type of mapping scheme may be more than that typically achieved in a cellular telephone system.

In a cellular telephone system, a user transmits a beacon signal at a fixed frequency. When the user moves from a first "cell" to a second "cell", the receiver located at the midpoint of the first cell no longer picks up the beacon signal, and the receiver located at the midpoint of the second cell picks up the beacon signal. The cellular telephone signal is thus "handed off" and the phone call is now under control of the second cell. It is only possible to locate the user in a relatively large area defined by the cells. There is no provision for locating the user more precisely within the cell. Thus, a cellular system may be limited in its ability to provide services requiring the precise location of the user.

In one embodiment the geographic based communication system is used in conjunction with cellular devices, wherein the known geographic locations are determined based on this relatively larger cellular area.

In one embodiment of the present invention, the system may determine the location of the PCD 110, but not operate to provide continual tracking of the PCD's whereabouts. For example, upon establishing a connection with an access point 120, the PCD 110 may transmit a message inquiring "Where is this AP?". Upon receiving an answer that the access point is located at the user's destination airport, the PCD 110 may then transmit an e-mail containing reservation information to a car rental agency or hotel via the access point 120. The access point routes the message through a network connected to the access point 120 so that the user's car or hotel room is ready upon his arrival. Once the E-mail message is provided to the access point, it is not necessary to continue to track the PCD.

In response to the message inquiring "Where is this AP?", the access point may transmit the location information of the access point to the PCD 110, and also transmit the presence of the PCD 110 to one or more service providers. These service providers may then transmit information, such as advertising, or services, to the PCD 110 (for use by the mobile user of the PCD 110), based on the location information. The PCD 110 may also initiate actions based on this location information. The AP 120 in this embodiment may not "ping" the PCD 110 to determine if the PCD 110 is still in range of the AP 120. The AP 120 in this embodiment also may not transfer the ID of the PCD 110 to a neighboring AP 120 if the PCD 110 moves outside the geographic area served by the AP 120.

In an alternative embodiment, one or more selected APs may be programmed to watch for the arrival of a particular PCD (target PCD). Upon detecting the presence of the target PCD, the AP establishing the link with the target PCD sends a message directly to a service provider, such as a rental car agency, hotel, etc., to arrange for the appropriate services to be ready for use by the MU upon the MU's arrival. Since the message has been sent, other APs can then be directed to cease watching for the target PCD.

The MU in this embodiment may choose to signal the AP 120 that the PCD 110 is to be kept in contact with the closest AP 120 at all times. The AP 120 in this embodiment actively and preferably regularly "pings" the PCD 110 to determine if the PCD 110 is still in range of the AP 120. The AP 120 in this embodiment also transfers the ID of the PCD 110 to the closest AP 120 if the PCD 110 moves outside the geographic area served by the AP 124.

Since the geographic location of the access point is known fairly precisely, service providers 140 are able to provide only the information that is pertinent to the MU and may track the MU's last reported location. For example, since updated information may be sent to the PCD 110 based on the location of the PCD 110, information that is pertinent only to the fact that the MU is, for example, in the hotel lobby need be sent back to the PCD 110 via the communication path between the access point 120 and the PCD 110.

Using this identification and location data, network 130 provides desired services (or arranges to provide desired services by accessing appropriate service providers) and information to the PCD 110. Based on the type of information required, network 130 may access one or more service providers 140 to provide the goods, information and/or services to the user based at least partially on the user's geographic location.

One embodiment of a system according to the present invention also has processing and memory access to operate in an interactive or adaptable mode. For example, when a MU arrives at the airport, his identity, as well as the fact that he is at the airport, is detected by an AP 120, for example using the beacon signal emitted from the PCD 110 as previously described. The AP 120 may then provide the known geographic location of the user to a service provider. One or more service providers with access to transportation schedules, flight status information, hotel or automobile rental information, weather information, ground maps or other information desired by the MU employs network 130 to send the user updated information about whether a connecting flight has been delayed, alternative routings, where to go to pick up a pre-specified rental car, directions to a preferred hotel and other types of information.

Figure 6:
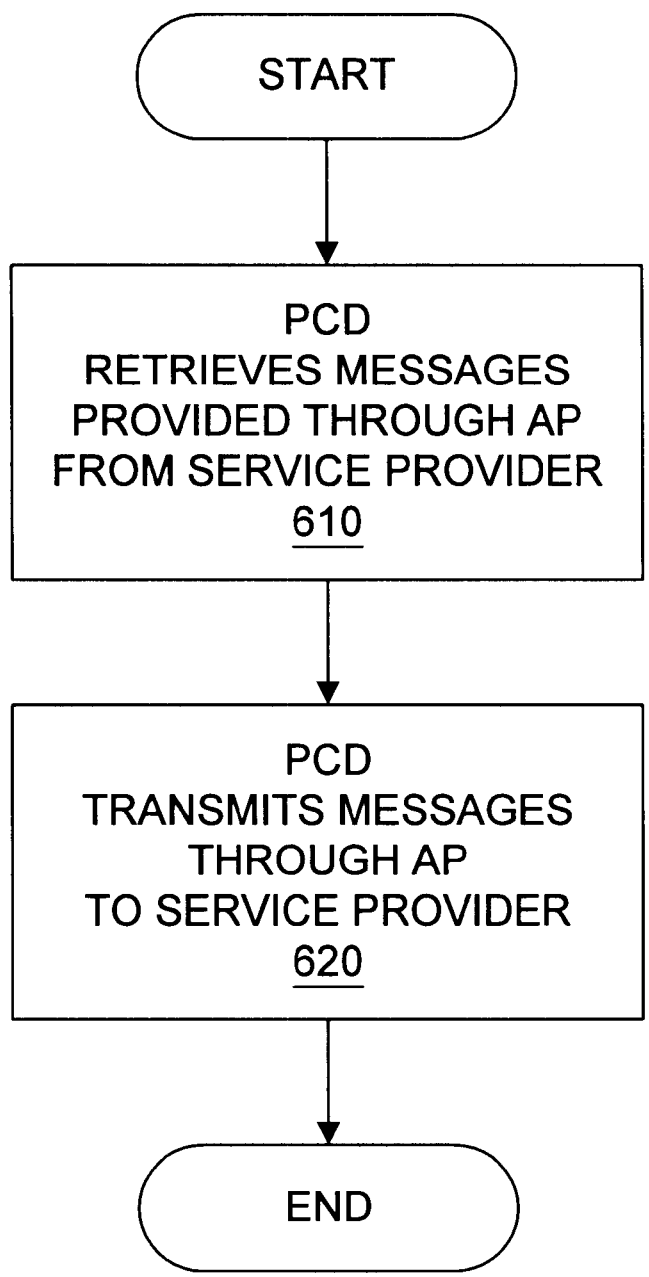
FIG. 6 is a flowchart of one embodiment of a method for providing a message exchange service for a MU through a geographic based communication system.

FIG. 6: Message Exchange Service Provider

The flowchart of FIG. 6 illustrates one embodiment of a method of exchanging messages through a service provider that offers a message exchange service for a MU, using a geographic based communication system. Here it is presumed that the PCD 110 of the MU has contacted or communicated with an AP 120.

In step 610 the PCD 110 retrieves messages through the AP 120. For example, a MU may instruct a message exchange service provider to retrieve E-mail from an existing account. The PCD 110 of the MU may provide various account information such as network address, login, password, etc. through the AP to the message exchange service provider. In response, the message exchange service provider may retrieve e-mail from the MU's account and forward this e-mail over the network 130 through the AP 120 to the PCD 110 of the MU. The e-mail account information may be stored on the message exchange service provider so the MU does not need to re-enter the information on a subsequent connection, but rather the MU or PCD may provide an ID code. A message exchange service provider may also be capable of checking voice-mail messages and forwarding them to a PCD for perusal by the MU. This may be accomplished by the message exchange service provider converting voice-mail messages from analog to digital format and then transmitting the digital data to the PCD 110 through the AP. In another embodiment, the message exchange service provider only transmits the number of voice-mail messages to the PCD 110.

In step 620 the PCD 110 transmits messages through an AP to the message exchange service provider. Message formats may include, but are not limited to, e-mail, facsimile, telephone, and video messages. Facsimile messages may be transmitted, for example, from a software application on the PCD 110.

For example, a document may be created using Microsoft WORD and transmitted through a message exchange service provider to a remote fax machine or PCD. A real-time video message may be sent, for example, to a remote PCD, or to any computing device connected to an attached network, such as the Internet, using software such as CUSeeMe or Microsoft NetMeeting. Alternatively, a video message may be recorded by a MU on their PCD and sent to a remote PCD for future retrieval.

Figure 7:
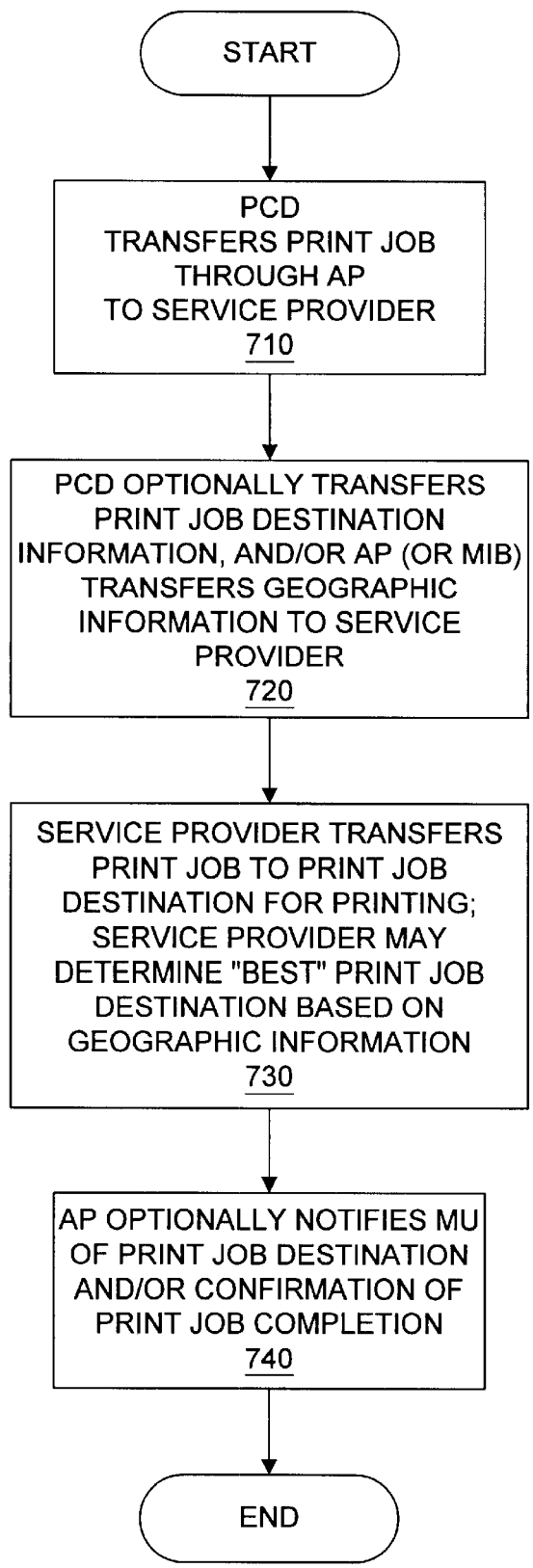
FIG. 7 is a flowchart of one embodiment of a method for completing a print job through a service provider that offers printing services through a geographic based communication system.

FIG. 7: Printing Service Provider

The flowchart of FIG. 7 illustrates one embodiment of a method of completing a print job through a service provider that offers printing services through a geographic based communication system.

In step 710 the PCD transfers a print job through the AP to the service provider. The print job may be sent in numerous different file formats. In one embodiment, the service provider printing service is set-up as a printer on the PCD. For example, a laptop computer user may receive information or drivers from a service provider that offers a printing service. This information or drivers enable the MU to add the printing service to the control panel of the PCD. Once installed, the drivers allow the MU to print any documents, figures, graphs, etc. to the service provider's printer, much like a local printer, simply by selecting the service provider's printing service as the output device. In another embodiment, the file to be printed (e.g., Microsoft WORD document, Microsoft EXCEL spreadsheet, Adobe PHOTOSHOP drawing, etc.) is sent to the printing service as an e-mail attachment. The file to be printed is then processed by the service provider to provide the proper data format to the printing device.

In step 720, the PCD optionally transfers print job destination information to the service provider. Alternatively, or in addition, the AP transfers geographic information to the service provider. In one embodiment, the AP 120 (the AP that the PCD is communicating with) sends geographic information to the service provider. The service provider may have several printing devices (e.g., laser printers, color printers, plotters, etc.) at multiple locations. The service provider may use the geographic information provided by the AP to select the printing device that is the closest to the geographic location received by the service provider that is capable of completing the received print job. For example, consider a MU who enters a hotel for a convention and needs several color documents printed from his PCD (e.g., a laptop computer) for a presentation. The MU connects his PCD 110 to an AP 120, with which he is registered, and establishes a connection with a service provider that offers printing services. The MU sends the print job from his PCD to the service provider through the AP. The AP sends geographic information to the service provider, in addition to the print job. The service provider determines which printing device that offers the requested services is closest to the MU. In this example, because the MU is requesting poster color prints, the service provider may not be able to use the nearest printing device for this print job, but may need to access an oversized printing device that is further away.

In step 730, the service provider transfers the print job to the selected printing device. The service provider may determine the "best" printing device according to the geographic information received and the requirements of the requested print job. In one embodiment, a MU may instruct the service provider of a planned future geographic location at which the MU would prefer to pick up the print job. For example, a MU that is communicating with a wireless AP may not want the print job to be performed at the current nearest printing device to the AP. The MU may desire that the print job be sent to his final destination. For example, a MU who is on his way to the airport may desire a document to be printed for retrieval at the airport before boarding a plane. The MU may contact a service provider through his PCD through a connection to a wireless AP on the way to the airport. The MU may then send information from his PCD regarding the desired print location for the print job. The print job may then be sent to the airport. In addition, a MU may send time information from his PCD to a service provider offering printing services. For example, the MU traveling to the airport may not want the print job printed until immediately before he arrives. The service provider may store the print job and transmit the print job to the appropriate printer at the time desired by the MU.

In step 740, the service provider, through the AP, optionally notifies the MU of the print job destination (e.g., the selected printing device) and/or confirmation of the completion of the print job. In one embodiment, a confirmation of completion of the print job is sent to the PCD from the service provider. If the PCD is no longer connected to the AP, the AP may store the printing confirmation for a period of time before deleting it. If the MU did not specify a print location, the service provider may send detailed information describing the location of the printing device. In addition, the service provider may send information regarding the fees that are due upon pickup or, alternatively, the fees that were charged to the MU account.

Figure 8A:
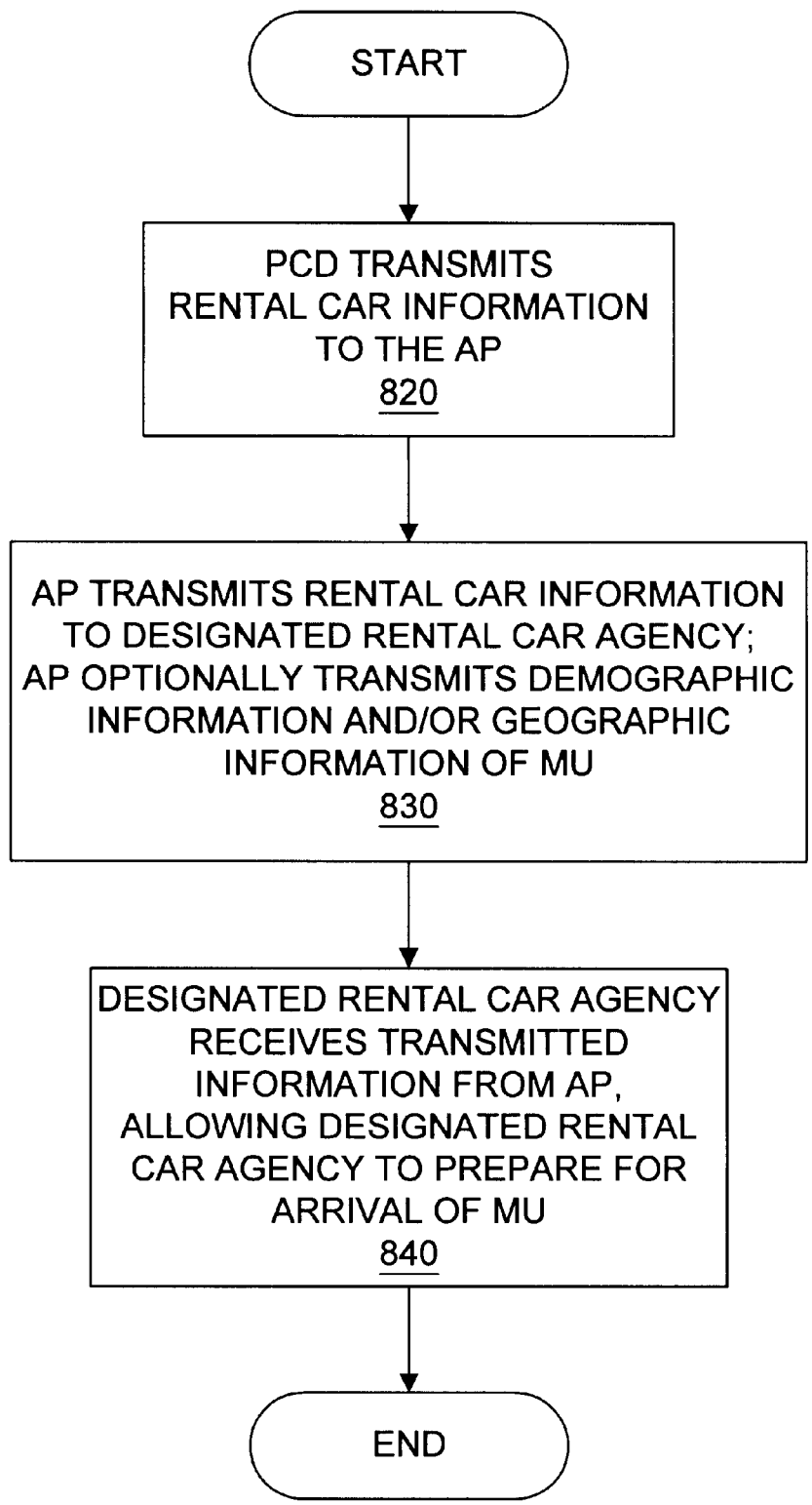
FIG. 8A is a flowchart of one embodiment of a method for reserving a rental car through a geographic based communication system.

FIG. 8A: Method for Placing Rental Car Reservations

The flowchart of FIG. 8A illustrates one embodiment of a method of reserving and/or processing a rental car through a service provider (e.g., a rental car agency) through a geographic based communication system.

In step 820 the PCD 110 transmits rental car information to the AP 120. In a preferred embodiment the MU has a preferred rental company, car type, and insurance preferences stored in the database of user information 325B and/or the service provider (the rental car agency). This may allow the MU to simply transmit (using the PCD) the identification of the MU as well as location and duration of the rental period to the AP 120. For example, the information stored in the service provider's memory for a particular MU may indicate that the MU typically requests a four-door intermediate-size car. Referencing this information, the service provider may automatically reserve a similar vehicle, unless otherwise instructed by the MU.

In step 830 the AP 120 or a service provider transmits the rental car information to the designated rental car agency. In one embodiment, demographic data of the MU is transmitted to the rental car agency. For example, the name, address, phone number, etc. may not have to be re-entered by the MU. Instead, this information may be read from the database of user information 325 and transmitted to the rental car agency either by the AP 120 or by another service provider connected to the network 130. In addition, if an appropriate rental car is found at the desired agency, the PCD 110 may be operable to transmit credit card information to the rental car agency through the AP 120.

In step 840 the designated rental car agency receives the information from the AP 120 and prepares for the arrival of the MU. If a MU did not specify a time to pick up the rental car, but the geographic information of the AP indicated that he was on the way to or at the airport, the service provider may be operable to compute an expected time of arrival as a function of the MU's current geographic location, the location of the rental car, current traffic conditions, etc. After the reservation is complete and the rental car is ready for pick-up the rental car agency may transmit a message to the MU's PCD indicating the state of preparedness. The rental car agency may also transmit data to the AP and/or the MU's PCD indicating the total cost, amount charged to credit card, scheduled return date/time, and any other information that is customary to provide.

In another embodiment, the MU has previously made the rental car reservation. Thus, in step 820 the PCD 110 of the mobile user transmits the previously made rental car reservation information to the access point. This may involve the PCD 110 transmitting the reservation ID number or other information which identifies the particular reservation of the mobile user. In step 830 the AP 120 transmits the rental car information to the designated rental car agency. The AP 120 also preferably transmits geographic information indicating the known geographic location of the access point. In step 840 the rental car agency receives the transmitted information from the AP 120, including the reservation identification and the known geographic location. Based on the known geographic location of the mobile user as provided by the AP, the rental car agency can optionally begin processing the rental car reservation based on the estimated time of arrival of the mobile user. For example, if the known geographic location information indicates that the mobile user has arrived in the destination airport, then the rental car agency can presume the user will be at the rental car counter within 20 minutes, and thus can begin processing the reservation to ensure that the reservation processing has been completed by the time the mobile user actually arrives at the rental car counter.

Figure 8B:
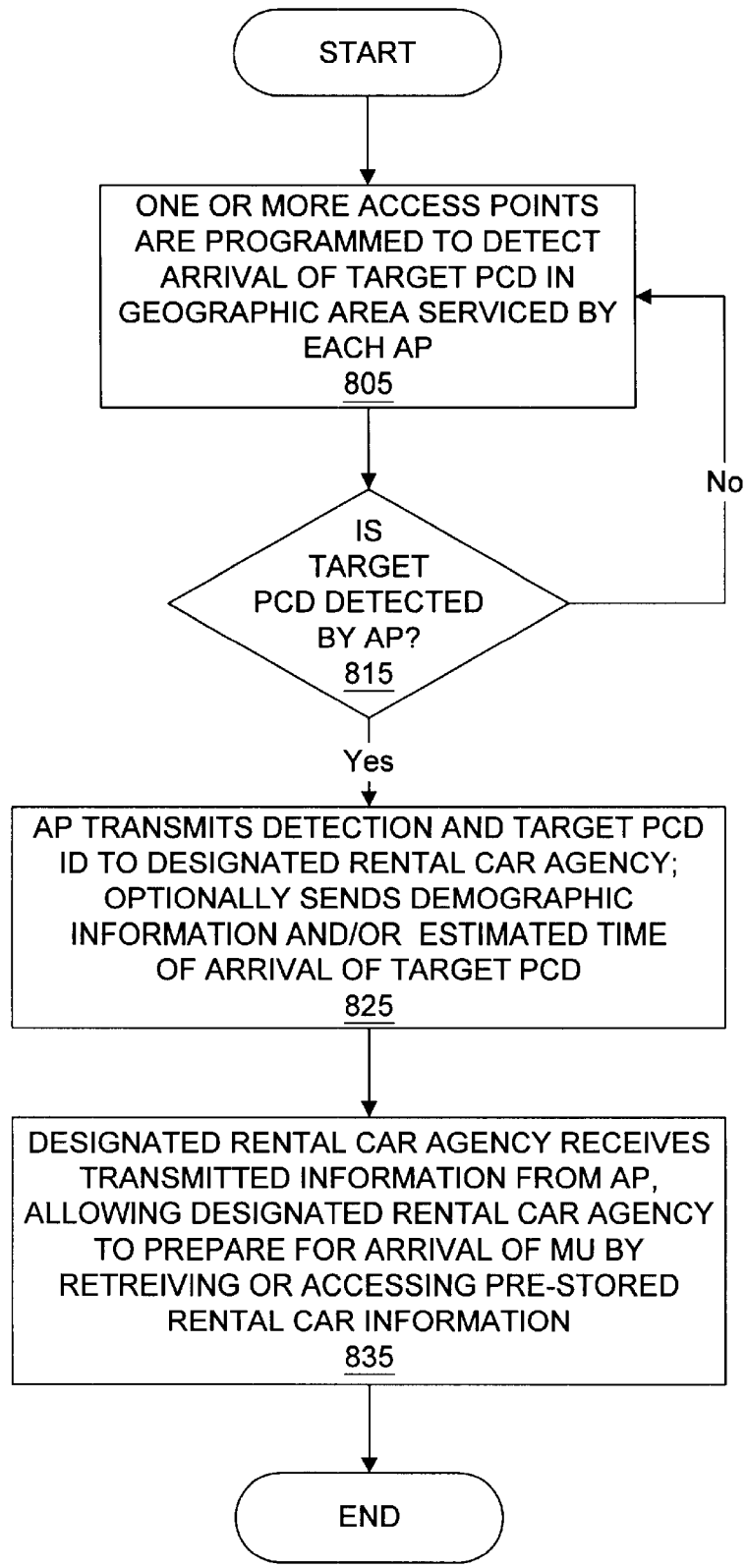
FIG. 8B is a flowchart of an alternative embodiment of a method for reserving a rental car through a geographic based communication system.

FIG. 8B: Alternative Method for Placing Rental Car Reservations

The flowchart of FIG. 8B illustrates an alternative embodiment of a method of reserving or processing a rental car through a service provider (e.g., a rental car agency) through a geographic based communication system.

In step 805 one or more access points may be programmed to detect the arrival of a target MU's PCD in a geographic area serviced by each AP 120. In other words, certain MUs may generally require a rental car (or generally have previously made rental car reservations) when in the geographic proximity of a particular AP. For example, the San Diego, Calif. airport may have an AP 120 inside the airport near the arrival gate of one or more incoming flights. The AP 120 may be configured to recognize certain MUs (e.g., target PCDs being used by the MUs) that require a rental car on each visit to San Diego.

In step 815 the AP 120 detects a MU's PCD 110 that is on the list of target PCDs that require a rental car when in the geographic vicinity of the AP.

In step 825, the AP 120 transmits identification of the detected PCD 120 to the appropriate service provider or rental car agency. For example, the MU visiting San Diego may be using a PDA operable to establish a wireless communication with a wireless AP. As the MU walks in to the geographic proximity of the AP, a connection is made and the AP determines that the MU requires a rental car. This may all be done without the MU removing the PDA from his suitcase. The AP may transmit information to the rental car agency indicating the current geographic location of the MU and/or expected time of arrival at the rental car agency. The PCD may also subsequently send information through the AP to the rental car agency regarding the rental car preferences and demographic data of the MU. Alternatively, the MU has previously made rental car reservations, and the PCD of the MU transmits a reservation ID to the AP 120, which may then be transmitted to the designated rental car agency along with geographic location information of the MU.

In step 835, the designated rental car agency receives the information from the AP and prepares the appropriate rental car. The rental car agency may charge a credit card on file for the MU or may receive credit card information from the database of user information 325B. The service provider may also calculate an expected time of arrival from the geographic location information provided by the AP.

In one embodiment, a service provider receives the identification of the PCDs and also may receive preference information from the PCDs. The service provider may then select rental car agencies for registered MUs based on this preference information. Where the MU has previously made rental car reservations, the rental car agency receives the reservation information and begins processing the reservation, possibly based on an ETA calculated from the know geographic location of the MU, so that the rental car is ready when the MU arrives.

Figure 9A:
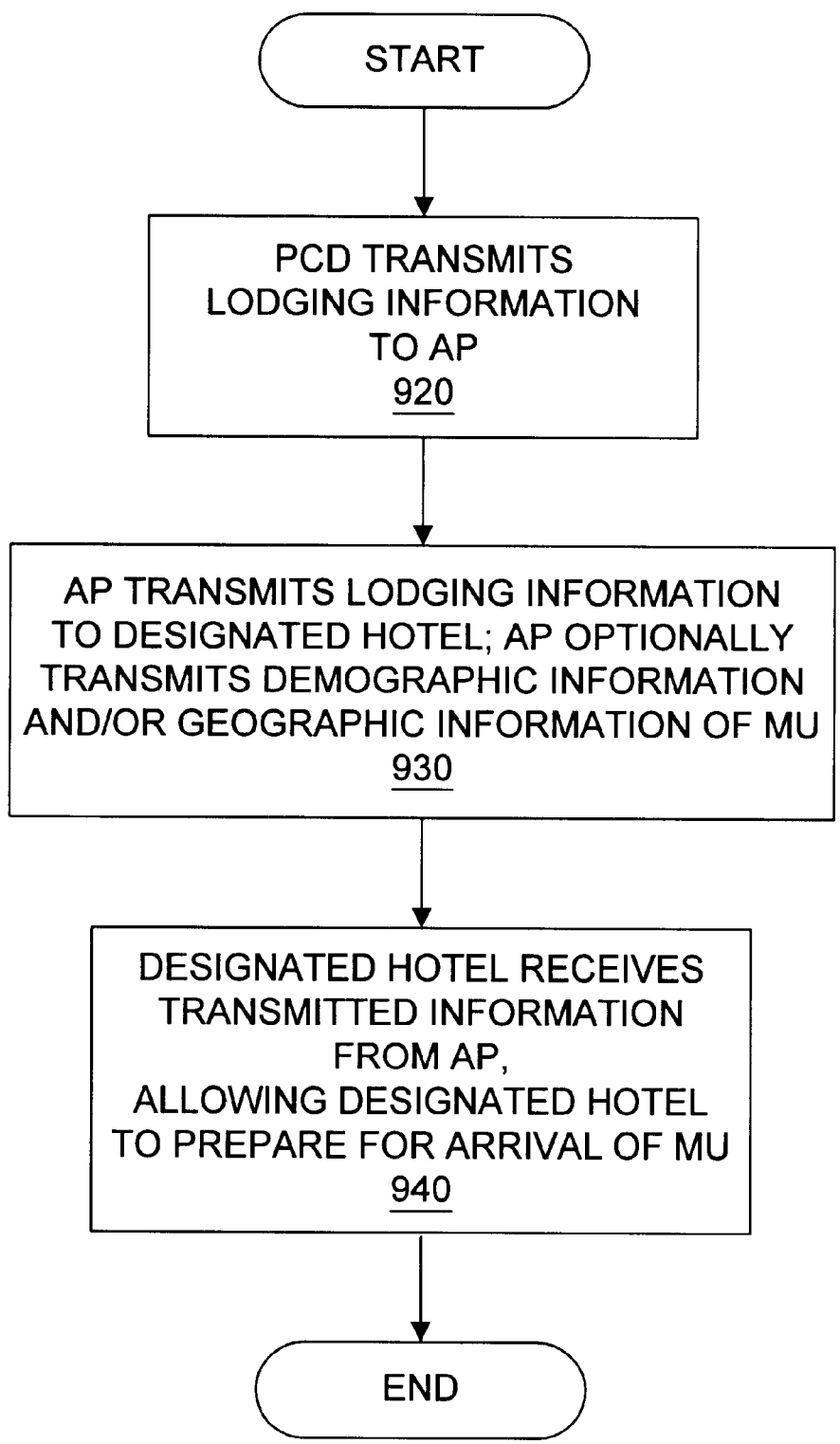
FIG. 9A is a flowchart of one embodiment of a method for placing hotel reservations through a geographic based communication system.

FIG. 9A: Method for Placing Hotel Reservations

The flowchart of FIG. 9A illustrates one embodiment of a method of placing or processing hotel reservations through a service provider (e.g., a hotel) in a geographic based communication system.

In step 920 the MU's PCD 110 transmits desired hotel reservation information through the AP 120. In one embodiment the MU has a preferred hotel company, room type, and amenities stored in the database of user information 325 and/or the service provider. Thus, in this embodiment, a MU's PCD 110 may only be required to transmit the location and duration of the desired hotel reservation to the AP 120.

In step 930 the AP 120 may transmit the desired hotel reservation information to the designated hotel. In one embodiment, the AP 120 may transmit the desired hotel reservation information to a service provider, where the service provider performs the function of selecting the designated hotel. For example, a MU is able to designate a specific hotel, but if a specific hotel is not designated, the service provider may be operable to select the hotel that most closely matches the preferences of the MU and/or the geographic proximity of the MU. In one embodiment, the MU may also be operable to transmit the MU's demographic data through the AP to the designated hotel or service provider. Thus, for example, the name, address, phone number, etc. may not have to be re-entered by the MU when the MU arrives at the hotel. Alternatively, the hotel or service provider may read this information from the database of user information 325 through the network 130. In addition, if appropriate accommodations are found at the designated hotel, the MU may be operable to transmit credit card information to the hotel. The hotel or service provider may also be able to access this credit card information from a secure server in the network 130.

In step 940 the designated hotel receives the desired hotel reservation information from the AP 120 or from the service provider, makes the reservation, and prepares for the arrival of the MU. As noted above, the designated hotel may also receive the geographic location information to determine an approximate estimated time of arrival (ETA) of the MU. After the reservation is complete, the hotel may transmit a message to the MU's PCD 110 indicating the state of preparedness. The hotel may also transmit data to the AP 120 and/or the MU's PCD 110 indicating the total cost, amount charged to credit card, scheduled checkout date/time, and any other information that is customary to provide.

In another embodiment, the MU has previously made the hotel reservation. Thus, in step 920 the PCD 110 transmits the hotel reservation identification number or other lodging information which signifies the reservation to the AP 120. In step 930 the AP 120 transmits the lodging reservation information to the designated hotel where the reservation has been made. The access point also transmits known geographic location information indicating the known geographic location of the mobile user as indicated by the AP 120. In step 940 the designated hotel receives the reservation information from the AP 120 as well as the known geographic location information. This allows the designated hotel to determine the estimated time of arrival of the mobile user based on this geographic information, and optionally begin processing the hotel reservation so this processing is complete by the time the mobile user arrives at the hotel counter. The hotel may also access other information from the network 130, such as user's demographic information or preference and habit information, such as whether the user prefers a smoking or non-smoking room, as well as credit card information to complete the transaction by the time the user arrives.

Figure 9B:
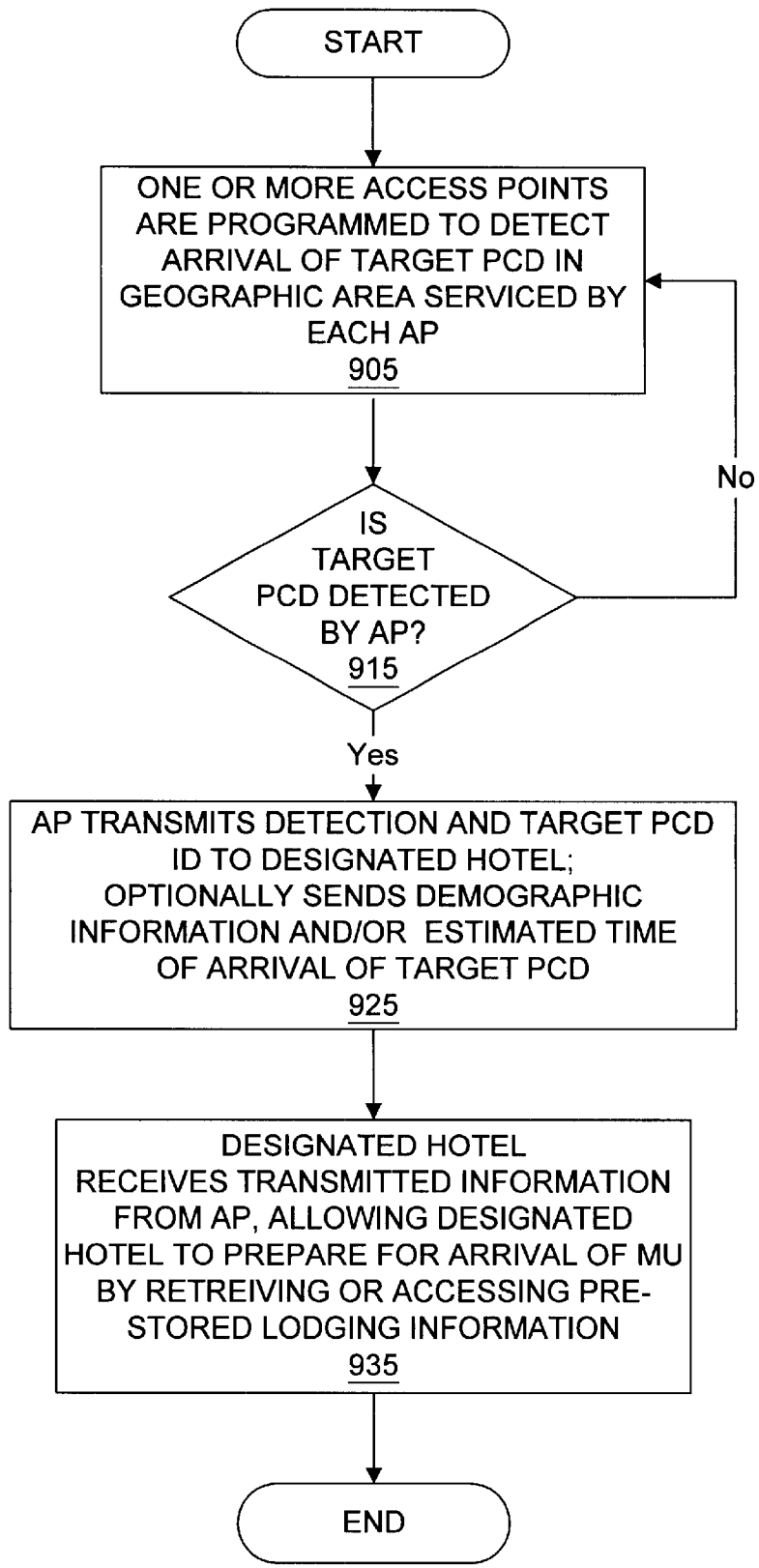
FIG. 9B is a flowchart of an alternative embodiment of a method for placing hotel reservations through a geographic based communication system.

FIG. 9B: Alternative Method for Placing Hotel Reservations

The flowchart of FIG. 9B illustrates an alternative embodiment of a method of placing or processing hotel reservations through a service provider that offers rooms for rent through a geographic based communication system.

In step 905 one or more access points 120 are programmed to detect the arrival of a target MU's PCD in a geographic area serviced by each AP. In other words, certain MUs may generally require a hotel reservation when in the geographic proximity of a particular AP. For example, the San Diego, Calif. airport may have an AP inside the airport near the arrival gate of one or more incoming flights. The AP may be configured to recognize certain MUs (e.g., target PCDs being used by the MUs) that require (or may have previously placed) hotel reservations on each visit to San Diego.

In step 915 the AP detects a MU's PCD that is on the list of target PCDs that require a hotel room when in the geographic vicinity of the AP.

In step 925 the AP may transmit the desired hotel reservation information to the appropriate hotel. In one embodiment, the AP 120 transmits the identification information of each respective MU to a service provider, wherein the service provider performs the function of selection and completing hotel reservations for each MU. Each MU may have a preferred hotel company, room type, and amenities stored in the database of user information 325B and/or at the service provider. Thus, in this embodiment, a MU may only be required to transmit the location and duration of the desired hotel reservation through the AP 120 to the service provider 140. Alternatively, the MU has previously made hotel reservations, and the PCD of the MU transmits a reservation ID to the AP 120, which may then be transmitted to the designated hotel along with geographic location information of the MU.

In step 935, the designated hotel receives the information from the AP and prepares (or confirms) the appropriate hotel reservations. The hotel may charge a credit card on file for the MU or may receive credit card information from the database of user information 325B. The hotel may perform other processing to ensure that the hotel is ready upon the user's arrival.

Figure 10A:
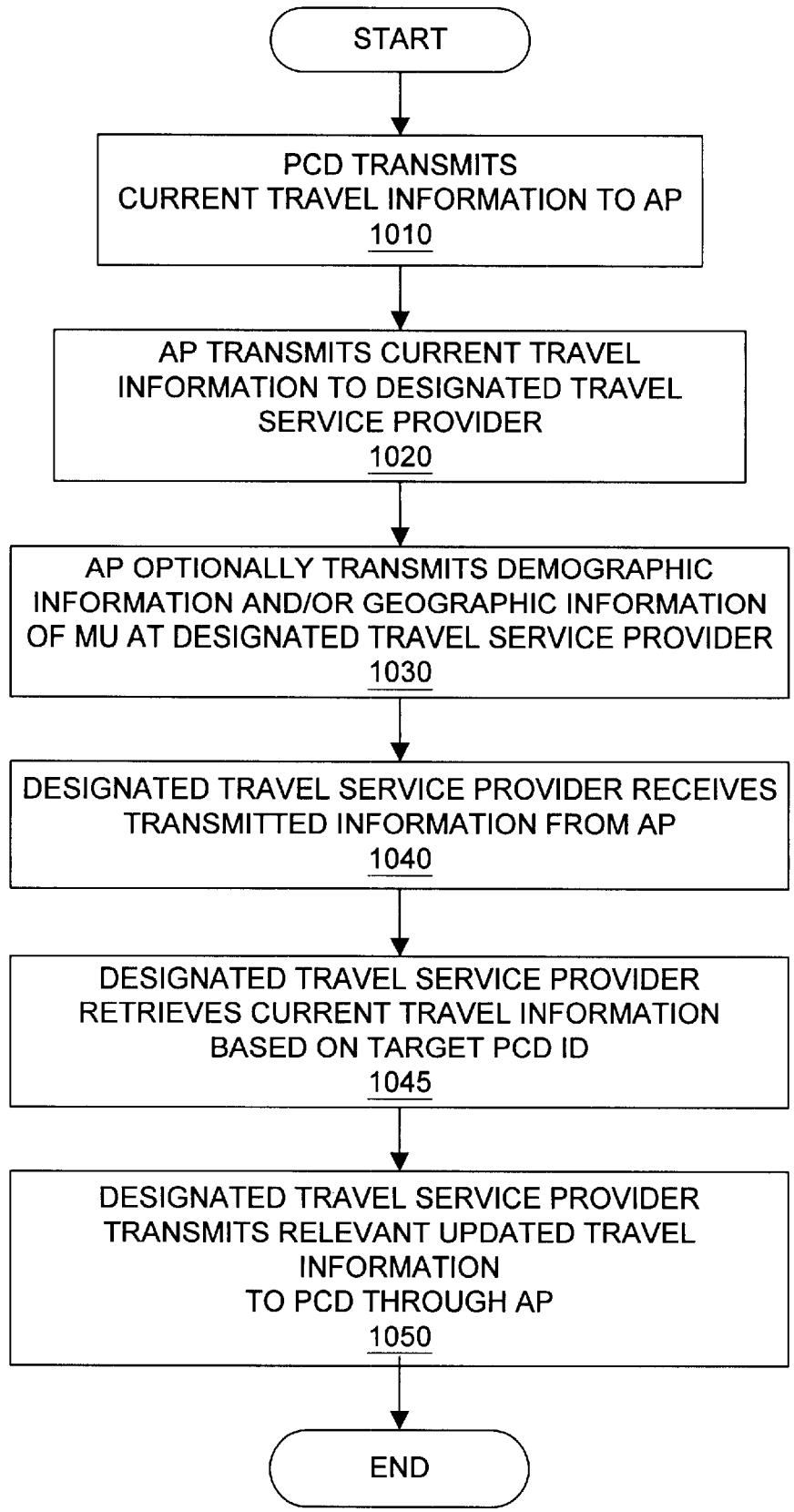
FIG. 10A is a flowchart of one embodiment of a method for reserving travel services through a geographic based communication system.

FIG. 10A: Method for Placing Travel Service Reservations

The flowchart of FIG. 10A illustrates one embodiment of a method of placing travel service reservations through a service provider 140 that offers travel services (e.g., airline, bus, train, taxi) in a geographic based communication system. The flowchart of FIG. 10A also illustrates a method for receiving updated travel information in a geographic based communication system.

In step 1010 the MU's PCD 110 transmits current or desired travel information to the AP 120. Where the MU desires reservations, the PCD may transmit a reservation request to the AP 120. In one embodiment, the MU has a preferred airline, seat type, and amenities stored in the database of user information 325B and/or the service provider. Thus, in this embodiment, a MU's PCD 110 is required only to transmit the departure location, the arrival location, and the date/time of travel of the airline reservation to the AP. Where the MU already has reservations, the PCD may transmit current travel information to the AP 120.

In step 1020 the AP 120 transmits the current or desired travel information to the designated travel service provider. Where the MU desires reservations, the MU is able to designate a specific airline, but if a specific airline is not designated, the service provider may be operable to select the airline that most closely matches the preferences of the MU and the geographic proximity of the MU.

In step 1030 the AP 120 may also be operable to transmit demographic data of the MU to the designated airline. For example, the name, address, phone number, etc. may not have to be re-entered by the MU. Instead, this information is received from the AP 120 or read from the database of user information 325 and transmitted to the designated airline. In addition, if appropriate accommodations are found at the designated airline, the AP may be operable to transmit credit card information to the airline.

In step 1040 the designated airline receives the current or desired travel information from the AP.

In step 1045 the designated airline prepares for the arrival of the MU. Where the MU desires reservations, the designated airline may make the appropriate reservation. This may include retrieving information from a database based on the target PCD's ID. Where the MU already has reservations, the designated airline or another service provider may obtain updated travel information relevant to the user, based on the user's current itinerary and/or the known geographic location of the MU.

In step 1050 the airline may transmit a message to the AP and/or the MU's PCD indicating the details of the reservation. The airline may also transmit data to the AP and/or the MU's PCD indicating the total cost, amount charged to credit card, scheduled flight dates/times, and any other information that is customary to provide. Where the MU already has reservations, the designated airline or another service provider may provide the updated travel information relevant to the user.

Figure 10B:
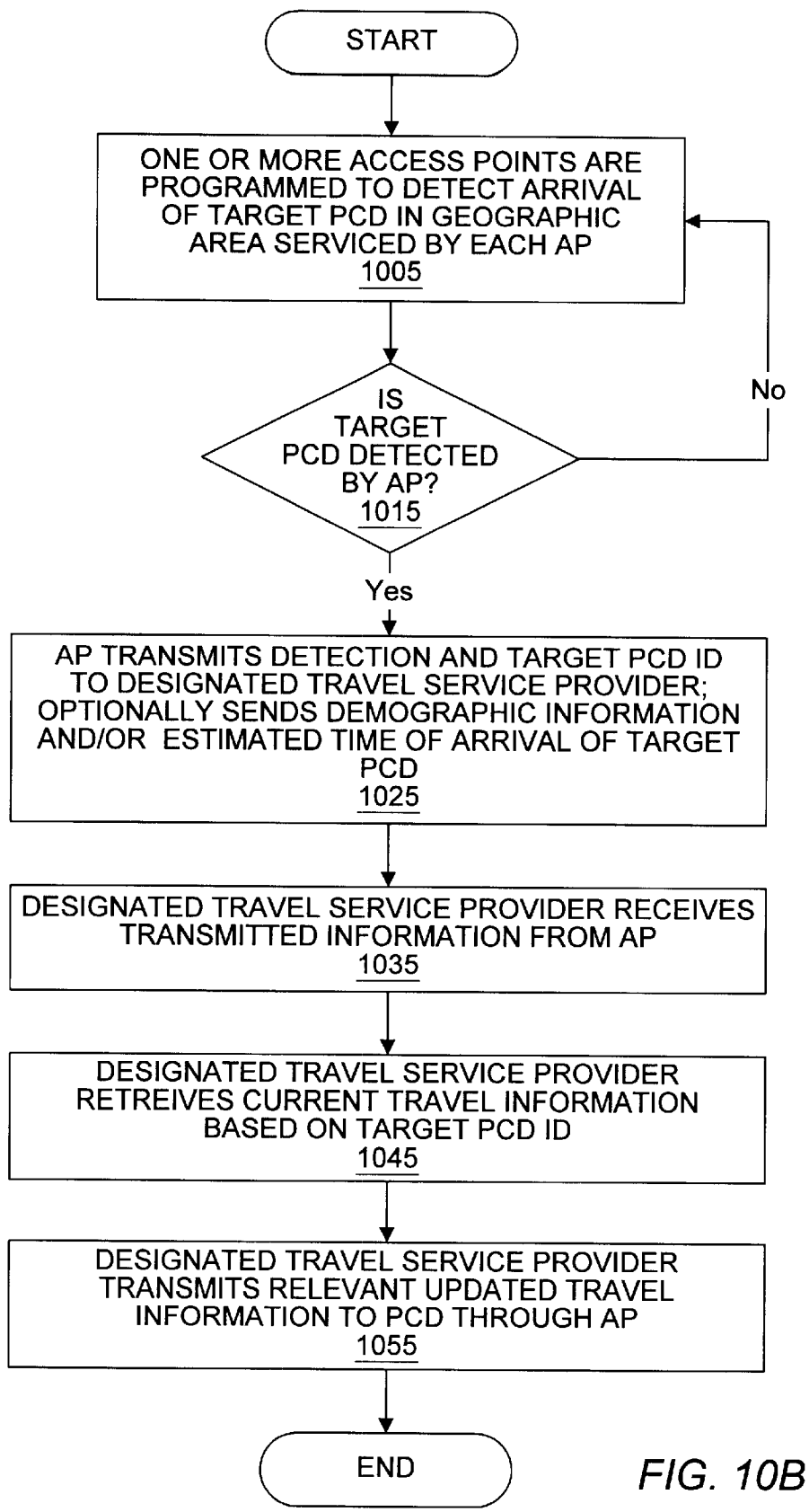
FIG. 10B is a flowchart of an alternative embodiment of a method for reserving travel services through a geographic based communication system.

FIG. 10B: Alternative Method for Placing Travel Service Reservations

The flowchart of FIG. 10B illustrates an alternative embodiment of a method of placing travel service reservations through a service provider that offers travel services (e.g., airline, bus, train, taxi) through a geographic based communication system. The flowchart of Figure 10B also illustrates a method for receiving updated travel information in a geographic based communication system.

In step 1005 one or more access points are programmed to detect the arrival of a target MU's PCD in a geographic area serviced by each AP. In other words, certain MUs may generally require a taxi when in the geographic proximity of a particular AP. For example, the San Diego, Calif. airport may have an AP inside the airport near the arrival gate of an incoming flight from Austin, Tex. The AP may be configured to recognize certain Mus (e.g., target PCDs being used by the Mus) that require a taxi to transport the MU from the airport to their hotel on each visit to San Diego.

In step 1015 the AP 120 detects a MU's PCD that is on the list of target PCDs that require a taxi when in the geographic vicinity of the AP.

In step 1025 the AP 120 transmits information to the appropriate taxi service. In one embodiment the MU has a preferred taxi service and amenities stored in the database of user information 325 and/or at the service provider. Thus, in this embodiment, a MU is required only to transmit the location of the MU (for pickup by the taxi service) and the requested destination to the AP.

In step 1035 the designated taxi service receives the information from the AP. In step 1045, the designated taxi service retrieves current travel information based on the PCD's ID, and dispatches a taxi to the location of the MU.

In step 1055 the designated taxi service may send a message to the MU's PCD indicating the estimated time of arrival of the taxi at the location of the MU, and identifying information about the taxi (e.g., color, license number).

The above method in flowchart of FIG. 10B may also be used for receiving updated travel information in a geographic based communication system as described above.

Figure 11:
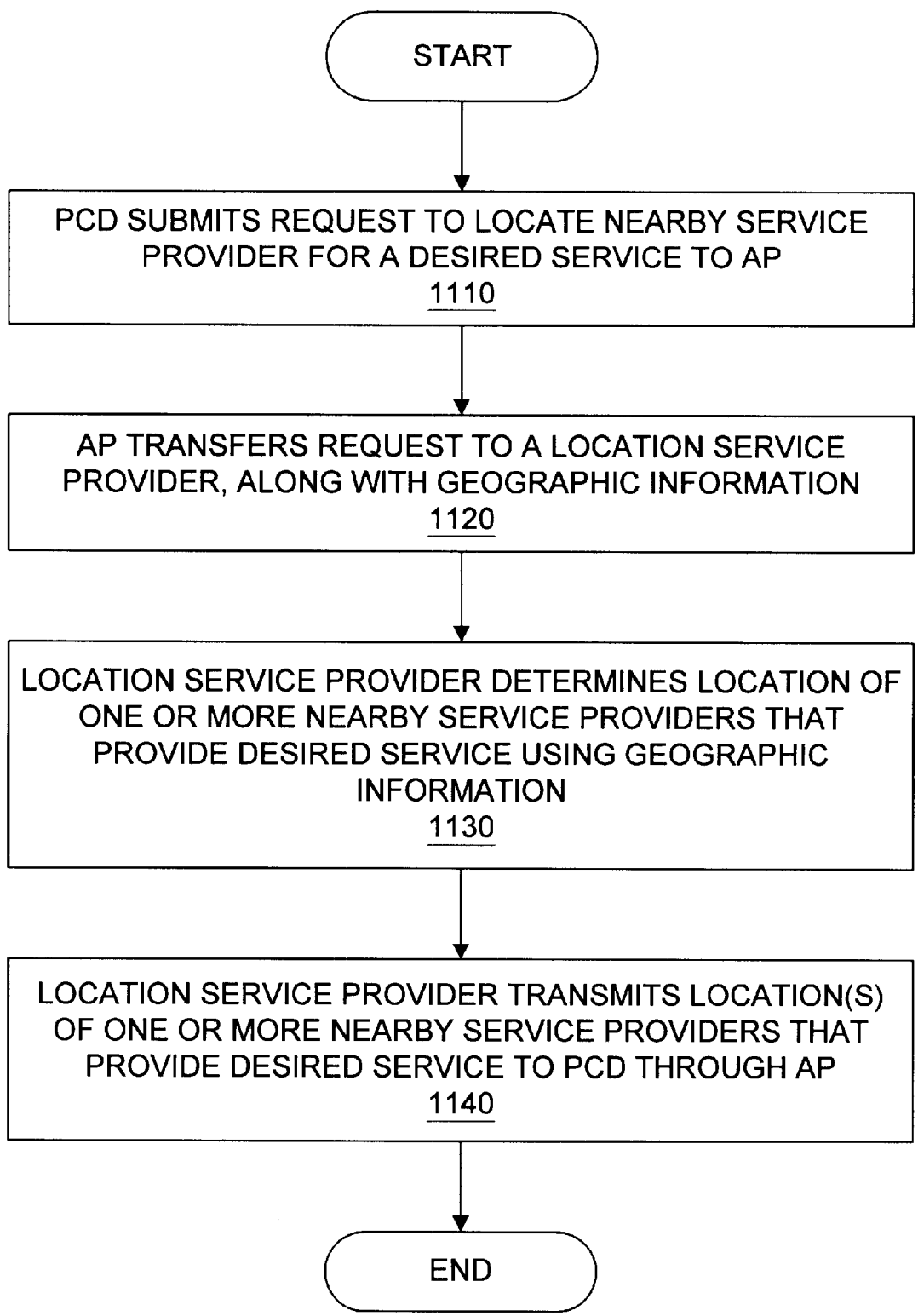
FIG. 11 is a flowchart of one embodiment of a method for locating the nearest service provider through a geographic based communication system.

FIG. 11: Method for Locating the Nearest Service Provider

The flowchart of FIG. 11 illustrates one embodiment of a method for locating the nearest service provider that offers a particular service (e.g., car rental agencies, hotels, restaurants, airline reservation centers, banks, department stores, malls, specialty shops, gift shops, convenience stores, taxi services, bus and train reservation offices, printing services, on-line database services, message services, E-mail services) through a geographic based communication system.

In step 1110 the MU's PCD 110 submits a request to locate a service provider, e.g., restaurants, in the immediate vicinity of the MU to the AP. In one embodiment the MU has certain preferences, e.g., a preferred food style (e.g., barbecue), restaurant style (e.g., fast food or table service), and amenities stored in the database of user information 325B and/or the service provider. Thus, in this embodiment, a MU's PCD is required only to transmit the request to locate restaurants to the AP.

As another example, the MU's PCD 110 may direct an inquiry through the access point 12 over the network 130 connected to the user's bank to locate the nearest ATM in the immediate vicinity of the MU. Since the MU's location is established with relative precision by the location of the hybrid wired and wireless access point 124, the service provider may respond with a message such as "Straight ahead to exit 3, turn right and proceed two blocks."

In step 1120, the AP transfers the request to locate a nearby service provider, e.g., restaurants offering the food style and restaurant style preferred by the MU, to a location service provider, along with the geographic location of the AP (which is also the geographic location of the MU). The location service provider may be the AP 120 or a separate service provider 140 connected to the network 130. If the desired service provider is not available in the immediate vicinity, the location service provider may suggest alternates based on the known geographic location which most closely match the user's preferences. For example, if a food style and/or restaurant style preferred by the MU are not available in the immediate vicinity, the location service provider may be operable to select alternative restaurants that most closely match the preferences of the MU and the geographic proximity of the MU.

In step 1130 the location service provider determines the location of any nearby providers, e.g., any restaurants offering the food style and restaurant style preferred by the MU, and/or alternative service providers that most closely match the preferences of the MU and the geographic proximity of the MU.

For example a mobile user of PCD 110A who connects to an access point 120 in a hotel lobby (e.g., through an infra-red port) may quickly receive information regarding restaurants, shops, services, etc. available in the immediate area. This information may include, for example, hotel room prices, shuttle service schedules, restaurant locations, menus, specials of the day, area event schedules, availability, and prices.

In step 1140 the location service provider may transmit a message to the AP and/or the MU's PCD indicating the locations of the providers, e.g., restaurants, found in step 1130, along with their names, food styles, restaurant styles, and any information available on the restaurants (e.g., specials, menus, credit cards accepted).

Because each access point contains a specific geographic location, the PCD 110A may receive information that is different when communicating with the same network at different locations served by different APs, for example, within a single hotel. In a hotel that includes several fast food restaurants, the nearest fast food restaurant may be different depending on the location of the PCD 110 and APs within the hotel. The specific geographic pinpointing feature also allows competitors to produce real-time competitive advertising.

For example, if a mobile user of PCD 110 is looking for a restaurant and is 10 yards from restaurant A and 100 yards from restaurant B, restaurant B may transmit an advertisement to PCD 110 that gives the mobile user of PCD 110 a discount for walking a few minutes to come to restaurant B. In a similar manner, a department store may transmit a "digital coupon" offering a discount to the next 5 customers who mention the digital ad. The digital coupon may be transmitted to all MUs in the geographic proximity, or may be transmitted only to MUs who have spent a certain amount of money in the respective store. The digital coupon may be transmitted to only MUs who are in the geographic proximity of APs inside or immediately outside the respective store, or alternatively, the digital coupon may be sent to MUs that are in the geometric proximity of all APs in the mall or near the mall entrances.

In addition, a digital coupon that is limited to a certain quantity of buyers (e.g., the first five customers that show the digital coupon) may be reserved or used immediately by a MU transmitting a signal back to the service provider indicating they would like to purchase the product and sending demographic and payment information. For example, a mobile user of PCD 110 has just entered a mall and received a digital coupon from Toys 'R' Us that states, "Next 3 customers to purchase a Nintendo 64 entertainment system pay only $29.99." If Toys 'R' Us is on the opposite side of the mall, and if the mobile user of PCD 110 wants to take advantage of this limited ad, the mobile user of PCD 110A may be able to instantly respond with credit card information to complete the discounted sale.

Figure 12A:
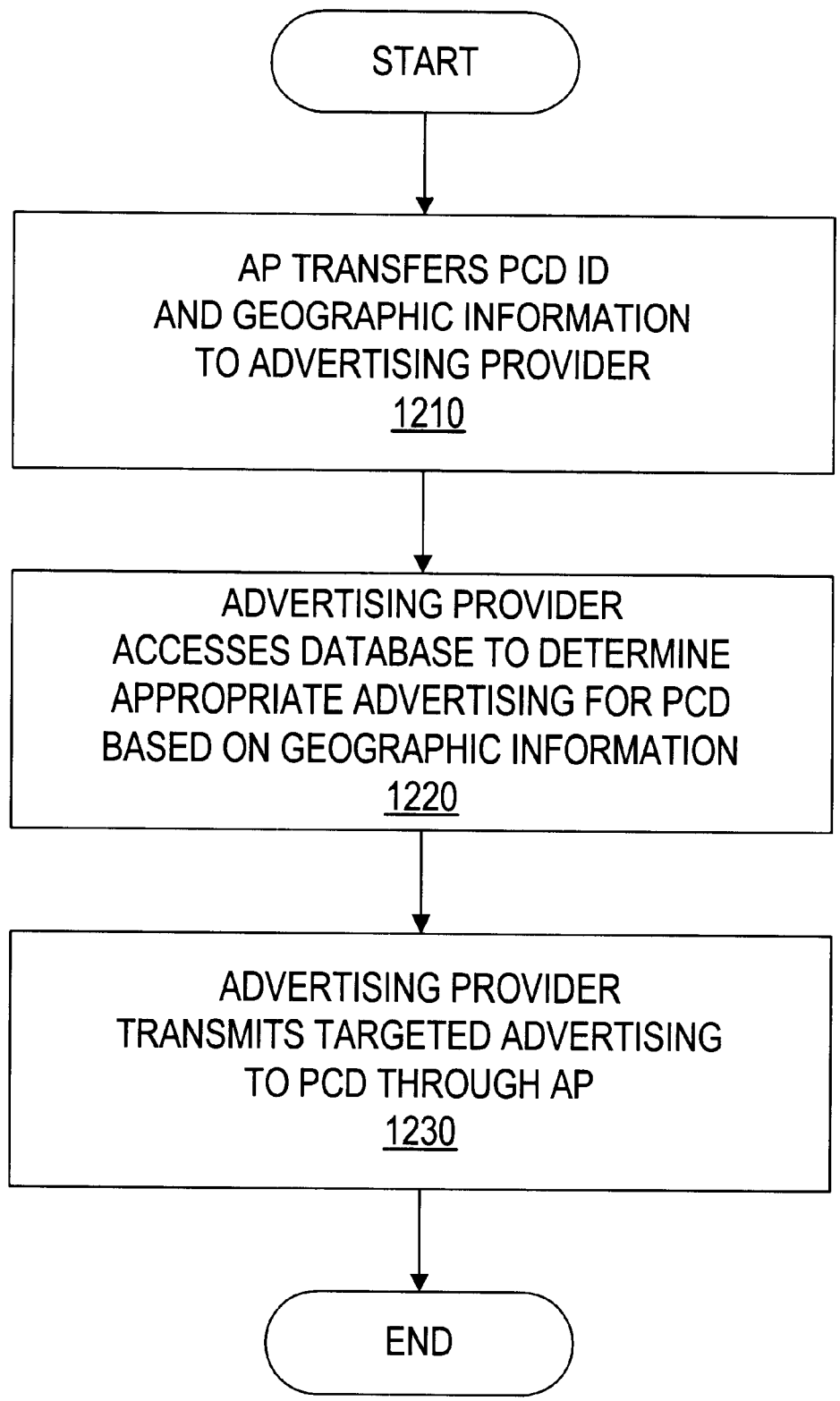
FIG. 12A is a flowchart of one embodiment of a method for providing targeted advertising through a geographic based communication system.

FIG. 12A: Method for Providing Targeted Advertising

The flowchart of FIG. 12A illustrates one embodiment of a method for providing targeted advertising through a service provider that offers advertising through a geographic based communication system. The targeted advertising may be based at least partly on the known geographic location of the MU as detected by an AP 120 (or as provided by GPS information by the PCD of the MU), and also possibly based on demographic information of the user.

In step 1210 the access point 120 detects a PCD 110 of a MU and transmits the PCD's ID and geographic information to an advertising provider.

In step 1220 the advertising provider may access a database, such as the advertising provider's proprietary databases, to determine appropriate advertising to be sent to the MU's PCD 110, based on the location of the AP 120. Thus the advertising may be selected based on the known geographic location of the user. The advertising may also be selected based on the known geographic location of the user as well as demographic information of the user, such as past purchases, spending habits, etc.

In step 1230 the targeted advertising that is chosen for the MU by the advertising provider is transmitted to the MU's PCD 110 through the AP 120. This targeted advertising may be time-sensitive, or quantity-sensitive, or unrestricted. An example of a time-sensitive advertisement is: "For the next 15 minutes, all watches are 25% off at ABC Watch Company, which is located in the A concourse, between gates 14 and 16." An example of a quantity-sensitive advertisement is: "The next 50 customers who request a submarine sandwich at DEF Restaurant will receive a free drink. The DEF Restaurant is located in the C concourse, between gates 23 and 25."

As a further example, a McDonalds franchise may be looking for a new store location in a city or a new store location within an airport or hotel. The McDonalds franchise may be interested in demographic data for different areas of the region of interest. This data may include demographic charts taken every hour, for example, which show the number, sex, ages, etc. of MUs at each access point at the different times. This demographic data may be compiled and presented in a variety of graphic formats. The information provider may also query the MUs that communicate with a specific access point (or all access points), asking each MU, "would you buy a BIG MAC right now if McDonalds was less than 3 blocks away?" This information may be compiled by the information provider and sold to McDonalds to aid in the determination of the best store location. MUs that answer such surveys may be rewarded with a digital coupon that allows them to buy BIG MACs for $0.99 for the next six months. MUs may also have the option to configure their PCDs to not accept unsolicited surveys.

Figure 12B:
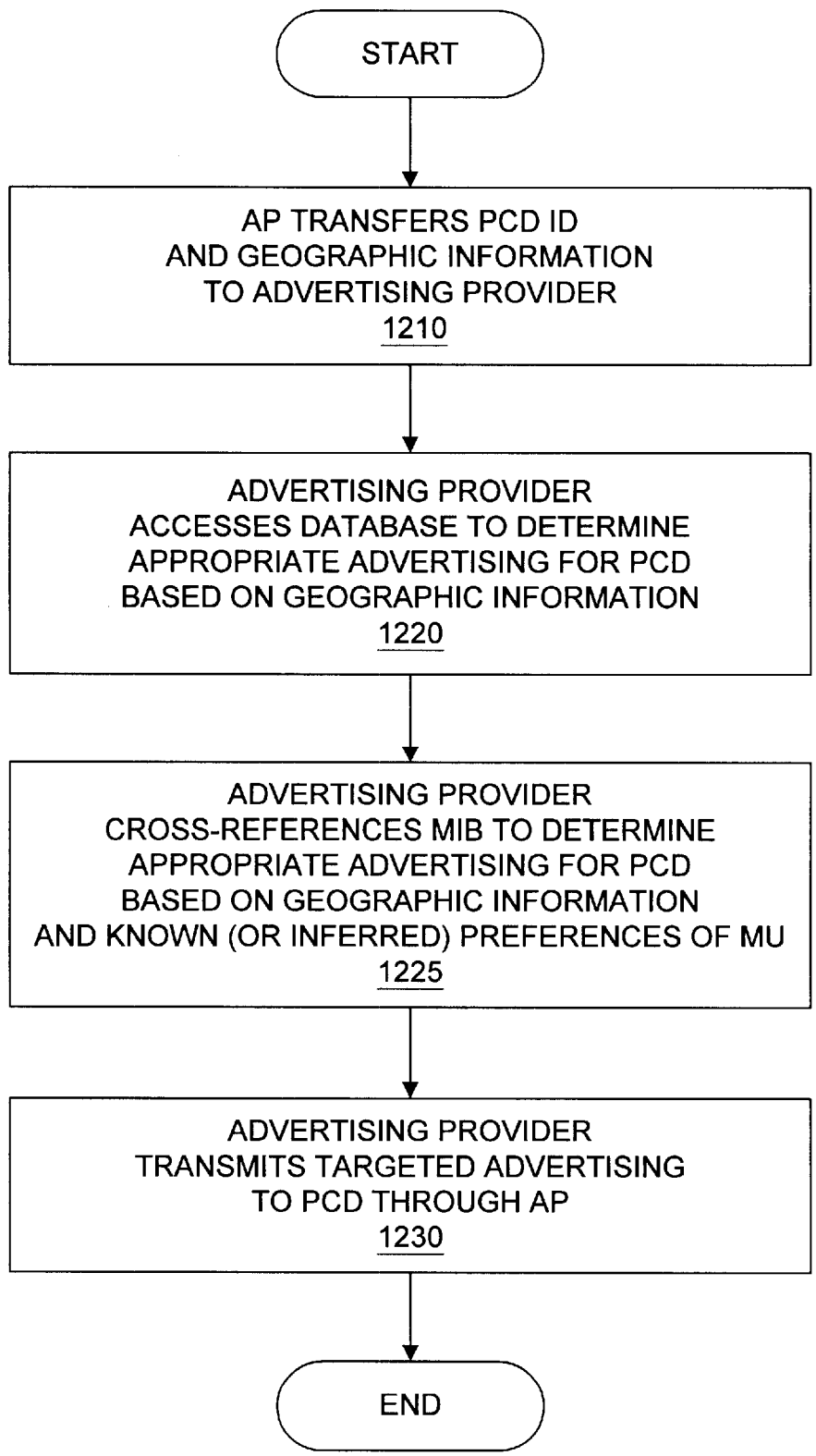
FIG. 12B is a flowchart of an alternative embodiment of a method for providing targeted advertising through a geographic based communication system.

FIG. 12B: Alternative Method for Providing Targeted Advertising

The flowchart of FIG. 12B illustrates an alternative embodiment of a method for providing targeted advertising through a service provider that offers advertising through a geographic based communication system. As with the method in FIG. 12A, the targeted advertising may be based at least partly on the known geographic location of the MU as detected by an AP 120 (or as provided by GPS information by the PCD of the MU), and also possibly based on demographic information of the user.

In step 1210 the AP the access point 120 detects a PCD 110 of a MU and transmits the PCD's ID and geographic information to an advertising provider. In one embodiment, demographic information on the MU's past purchases from the clients of the advertising provider may be stored in the database of user information 325 and/or the advertising provider. Certain demographic information may also be provided by the PCD 110 of the MU. Thus, in this embodiment, even if the MU has not visited any of the specific clients of the advertising provider near the location of the AP, the advertising provider may be able to provide suggestions of service providers in the area based on the past purchases of the MU as well as the geographic location information. The advertising provider may then send advertisements from service providers to which the MU is likely to respond (e.g., targeted advertising).

In step 1220 the advertising provider accesses the advertising provider's own proprietary databases to determine appropriate advertising to be sent to the MU's PCD, based on the geographic location of the AP.

In step 1225 the advertising provider additionally accesses the database of user demographic information 325 and/or the advertising provider's own proprietary databases to determine appropriate advertising to be sent to the MU's PCD, based on the location of the AP along with the preferences, habits or other demographic information of the MU. For example, using the known restaurant preferences of the MU, the advertising provider may extrapolate desired food styles (e.g., oriental) and/or restaurant styles (e.g., cafeteria) that may be of interest to the MU.

In step 1230 the targeted advertising may be selected based on one or more of the known geographic location of the MU and the demographic information of the MU. The targeted advertising that is chosen for the MU by the advertising provider is transmitted to the MU's PCD through the AP. This targeted advertising may be time-sensitive, or quantity-sensitive, or unrestricted. An example of a time-sensitive advertisement is: "For the next 15 minutes, all watches are 25% off at ABC Watch Company, which is located in the A concourse, between gates 14 and 16." An example of a quantity-sensitive advertisement is: "The next 50 customers who request a submarine sandwich at DEF Restaurant will receive a free drink. The DEF Restaurant is located in the C concourse, between gates 23 and 25."

As a further example, a service provider 140 (e.g., an arcade in a mall) may request information about visitors (MUs) that is carrying a PDA (PCD 110A) operable to communicate with an AP 120 in the mall entrance. As the visitor enters the mall, his PDA automatically connects to the AP 120. The arcade, along with other information and service providers coupled to network 130, is notified that the visitor is in the mall and is given the position of the visitor (the location of the AP 120). The approximate geographic location of the visitor is known because each access point has a unique geographic location.

In addition, there may be several different access points throughout the mall that track the visitor's movement through the mall. The service provider may desire to know certain demographic information, e.g., the age and sex, of each visitor that enters the mall in order to determine if a particular advertisement should be sent. The service provider may not desire to send advertisements to each visitor because royalties may be paid to the AP provider for each advertisement sent. The request for information about the visitor may be sent to processor 310 via network 130 and network interface 340. The processor 310 may then determine the desired demographic information, e.g., the age and sex of the visitor, stored in the database of user information 325 and read the appropriate information from memory 320 according to the database of user information 325. This information is then made available to the service provider through network interface 340 and network 130.

Alternatively, if the information requested from the service provider is not stored locally in the MIB 150, the processor 310 may send out a request to a specific information provider 140 requesting the specific information. Processor 310 may also store in memory billing information corresponding to each information and service provider 140 that requests information.

In a similar example, if the service provider is requesting specific details about the visitor, such as purchase habits for shoe apparel, the database of user information 325B may not contain information that specific. The processor 310 may determine, though, that there is an information provider 140 that stores this type of specific data, e.g., the purchase habits for shoe apparel. Processor 310 may then send a message to the service provider indicating that an information provider 140 is available that contains the specific information requested, along with the price of that information. The service provider may then agree to pay the fee to access the specialized information provider.

Figure 13:
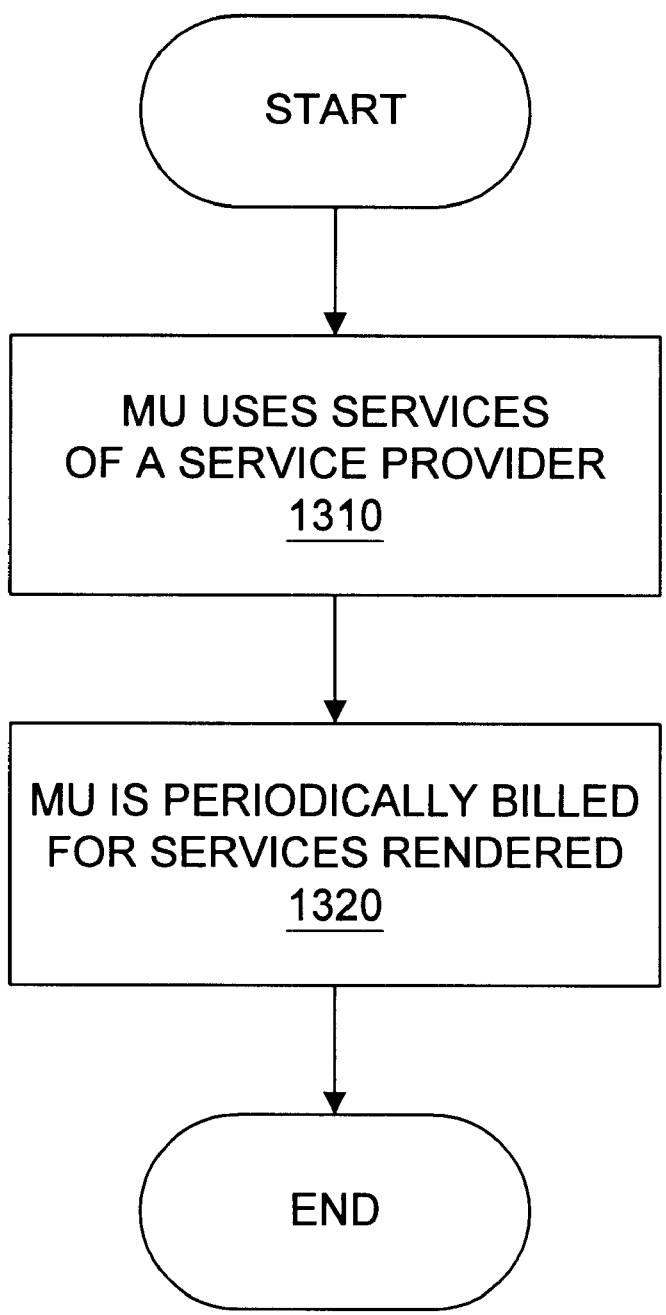
FIG. 13 is a flowchart of one embodiment of a method for providing geographic based billing through a geographic based communication system.

FIG. 13: Method for Geographic Based Billing

The flowchart of FIG. 13 illustrates one embodiment of a method for providing geographic based billing through a geographic based communication system.

In step 1310, the MU (using their PCD) accesses one or more service providers 140 and uses one or more services over a given period of time (e.g., daily, monthly, quarterly, yearly). Here it presumed that the PCD of the MU has previously connected to an AP 120 and accesses one or more service providers 140 on the network 130.

In step 1320 the billing information from all service providers 140 may be stored, such as in the database of user information 325. The MU may pay only one bill over a given period of time (e.g. a month) to the network system operator and the system operator owner may pay the charges to individual service providers 140. Alternatively, each service provider may be directly paid by the MU, either through a credit card or any other method of payment, at the time services are rendered.

The billing rate for a particular service may be different according to the geographic location of the MU. For example, a MU that receives a fax in a hotel conference room may pay a higher rate than if the fax were received in a print shop. This allows fluctuations in market costs of information and services according to geographic location. For example, the cost of living may be much higher in San Francisco than it is in Austin. Most products and services cost more if they are purchased in San Francisco, in comparison to Austin prices. The present invention allows a goods, information, and/or service provider, who provides the same service in both San Francisco and Austin, to charge different amounts for the goods, information, and/or services dependent upon the location where the service is provided.

Figure 14:
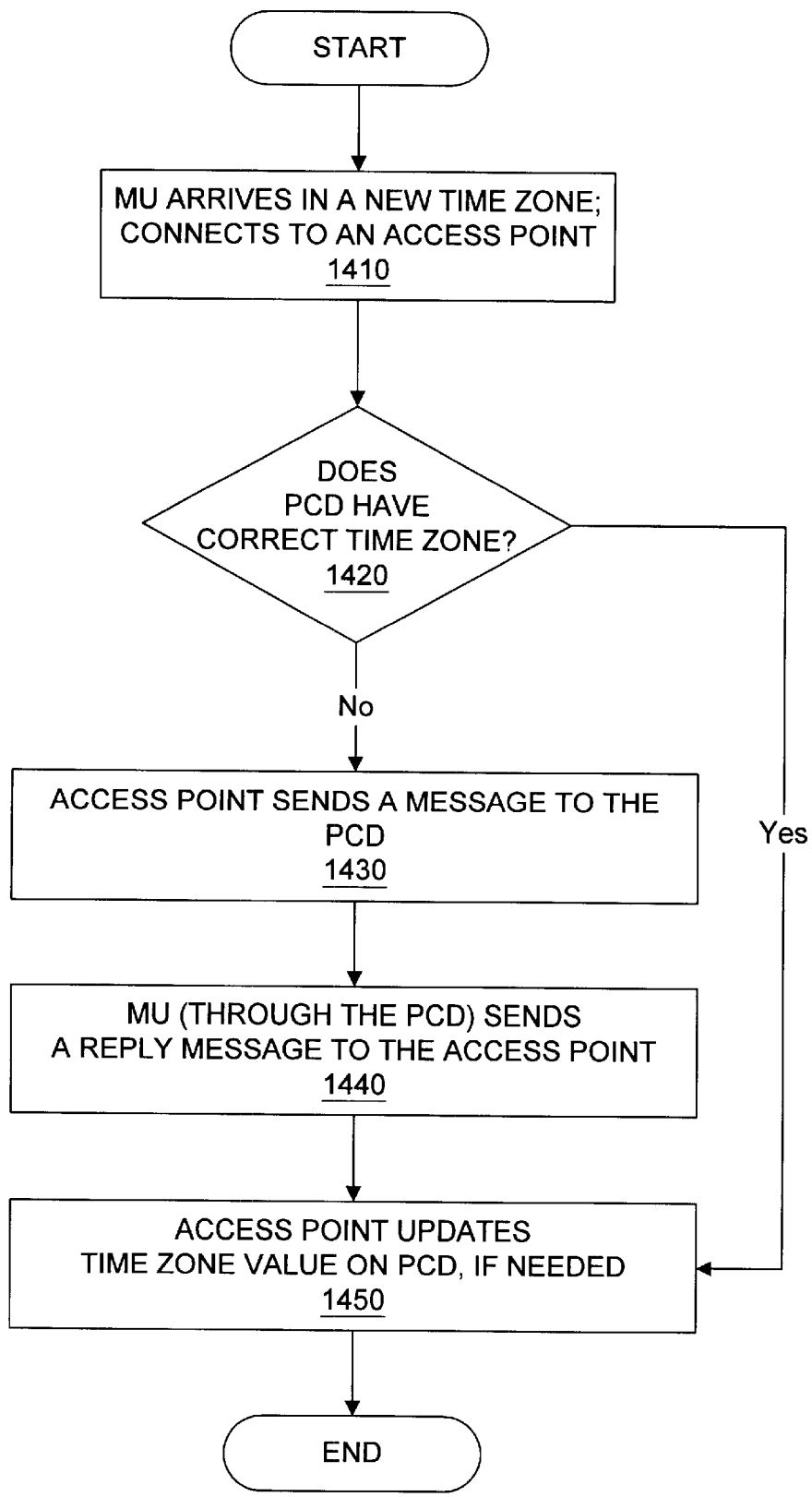
FIG. 14 is a flowchart of one embodiment of a method for automatically adjusting a PCD to the current time zone through a geographic based communication system.

FIG. 14: Method for Automatically Adjusting to Current Time Zone

The flowchart of FIG. 14 illustrates one embodiment of a method for automatically adjusting a PCD to the current time zone through a geographic based communication system.

In step 1410 a MU arrives in a new time zone and connects to the network via an access point. For example, the MU may have just arrived at an airport, or driven into a new time zone in an automobile.

In step 1420 the access point compares its stored local time zone with the local time zone of the MU's PCD. The local time zone for each access point may be stored either in the MIB 150 or directly in the access point.

In step 1430 the access point sends a message to the MU's PCD indicating that the local time zone is different from the time zone currently being used on the MU's PCD and may await a reply before changing the time zone.

In step 1440, the MU has indicated (by replying to the message sent in step 1430) that he would like the time zone updated. The access point then may update the time zone on the PCD to the local time zone.

Step 1450 is reached by either the MU not replying to the message sent in step 1430 within a user-specified time-out period (e.g., 60 minutes), or the MU replying to that message, and the access point completing the time zone update on the PCD.

Service Provider as an Infomediary

In one embodiment, the network provider or a service provider acts as an infomediary for the mobile users or subscribers. In other words, the network provider may maintain information regarding the mobile user from a database, or received from the mobile user, and selectively provide this information to information or service providers on the network. The network provider or service provider may selectively provide this information at the direction of the mobile user, possibly for the financial benefit of the mobile user.

What is claimed is:

1. A geographic-based network system, comprising:
   a portable computing device, wherein said portable computing device is configured to transmit identification information indicating a user of the portable computing device;
   a network;
   a plurality of access points coupled to said network and arranged at known locations in a geographic region, wherein a first access point of said plurality of access points in proximity to said portable computing device is operable to communicate with the portable computing device in a wireless fashion, wherein the first access point is operable to receive the identification information associated with the portable computing device, wherein, after receipt of the identification information, demographic information of the user of the portable computing device is identified, and said first access point is operable to transmit information of said portable computing device, wherein a content of said information is dependent upon a known location of said first access point and the demographic information of the user of the portable computing device.

2. The geographic-based network system of claim 1, wherein said first access point transmits said known location to a memory associated with said portable computing device, thereby advising said portable computing device of its location.

3. The geographic-based network system of claim 1, wherein the demographic information comprises one or more of memberships and associations of the user.

4. The geographic-based network system of claim 1, wherein the demographic information includes one or more of requirements, preferences, and habits of the user.

5. The geographic-based network system of claim 1, wherein the demographic information includes past transactions of the user.

6. The geographic-based network system of claim 1, further comprising:

a plurality of information providers coupled to said network, wherein each of said information providers is operable to provide said information through said network and through said first access point to said portable computing device based on the known location of said first access point and the demographic information of the user of the portable computing device.

7. The geographic-based network system of claim 1, further comprising:

one or more information providers coupled to said network, wherein a first information provider of said one or more information providers is operable to provide said information through said network and through said first access point to said portable computing device, wherein said first information provider provides said information dependent upon the known location of said first access point and the demographic information of the user of the portable computing device.

8. The geographic-based network system of claim 7, wherein said first information provider is operable to receive the known location of said first access point and the identification information indicating the user of the portable computing device;

wherein said first information provider selects said information to provide to the portable computing device based on the known location of said first access point and the demographic information of the user of the portable computing device.

9. The geographic-based network system of claim 7, wherein said one or more information providers include one or more of car rental agencies, hotels, restaurants, airline reservation centers, banks, taxi services, and bus and train reservation offices.

10. The geographic-based network system of claim 1, wherein the plurality of access points are located in an airport.

11. The geographic-based network system of claim 1, wherein the plurality of access points are located in a hotel.

12. The geographic-based network system of claim 1, wherein the network includes one or more of a local area network and a wide area network.

13. The geographic-based network system of claim 1, wherein said portable computing device includes a time clock, said time clock being updated to provide a time corresponding to actual time in a time zone in which said portable computing device is located, wherein a location of said portable computing device is determined in accordance with the known location of said first access point.

14. A geographic-based network system, comprising:

a portable computing device, wherein said portable computing device is configured to transmit identification information indicating a user of the portable computing device;

a network;

a plurality of access points coupled to said network and arranged at known locations in a geographic region, wherein each of said plurality of access points is configured to detect said portable computing device, wherein each of said plurality of access points is also configured to receive the identification information indicating the user of the portable computing device, wherein, after detection of said portable computing device by a first access point of said plurality of access points in proximity to said portable computing device, and after receipt of the identification information indicating the user of the portable computing device, demographic information of the user of the portable computing device is identified, and said first access point is operable to transmit information to said portable computing device, wherein said information is dependent upon a known location of said first access point and the demographic information of the user of the portable computing device.

15. A geographic-based network system, comprising:

a portable computing device, wherein said portable computing device is configured to transmit identification information;

a network;

a plurality of information providers coupled to said network;

a plurality of access points coupled to said network and arranged at known locations in a geographic region, wherein a first access point of said plurality of access points in proximity to said portable computing device is operable to receive the identification information from the portable computing device, wherein, after receipt of the identification information, a known location of said first access point and the identification information are transmitted to at least one information provider;

wherein the at least one information provider provides information through said network and through said first access point to said portable computing device, wherein the at least one information provider provides said information dependent upon the known location of said first access point and the demographic information of a user of the portable computing device.

16. The geographic-based network system of claim 15, wherein the at least one information provider selects said information to provide to the portable computing device based on the known location of said first access point and the demographic information of the user of the portable computing device;

wherein a content of said information is dependent upon the known location of said first access point and the demographic information of the user of the portable computing device.

17. The geographic-based network system of claim 15, wherein the demographic information include one or more of requirements, preferences, and habits of the user.

18. The geographic-based network system of claim 15, wherein the demographic information include information extrapolated from the user's past practices which indicates probable future actions consistent with the past practices.

19. The geographic-based network system of claim 15, further comprising:

a memory coupled to the network which stores location information comprising known locations of each of at least a subset of the plurality of access points.

20. The geographic-based network system of claim 15, wherein said information comprises travel itinerary information.

21. The geographic-based network system of claim 15, wherein said information comprises a nearest location of a service provider relative to the first access point.

22. The geographic-based network system of claim 15, wherein said information comprises promotions related to goods or services;

wherein said promotions are based upon the known location of said first access point.

23. The geographic-based network system of claim 22, wherein said first access point is located closely to a first provider of goods or services;

wherein said promotions comprise promotions of said first provider of goods or services.

24. The geographic-based network system of claim 15, wherein said information comprises advertising related to goods or services;

wherein said advertising is based upon the known location of said first access point.

25. The geographic-based network system of claim 24, wherein said first access point is located closely to a first provider of goods or services;

wherein said advertising comprises advertising of said first provider of goods or services.

26. The geographic-based network system of claim 25, wherein the first access point and said portable computing device communicate in a wireless fashion.

27. A method of using known locations of network access points (APs) to service mobile users who are in a vicinity of the APs, the method comprising:

(a) detecting the presence of a portable computing device in the vicinity of one of said APs;

(b) providing a known location of said one of said APs to an information provider after said detecting;

(c) providing identification information indicating a user of the portable computing device after said detecting;

(d) the information provider transmitting information to the portable computing device through said one of said APs, wherein a content of the information is dependent upon the known location of said one of said APs and demographic information of the user of the portable computing device, wherein said one of said APs communicates with the portable computing device in a wireless fashion.

28. The method of claim 27, further comprising:

the information provider selecting said information based upon the known location of said one of said APs and the demographic information of the user of the portable computing device, wherein said selecting is performed prior to said transmitting.

29. The method of claim 27, further comprising:

the information provider accessing the demographic information of the user associated with said identification information, wherein the information provider selects said information at least partly based upon said demographic information.

30. The method of claim 27, wherein said providing the identification information comprises the portable computing device providing the identification information through said one of said APs to the information provider prior to said transmitting.

31. The method of claim 27, wherein the demographic information include one or more of requirements, preferences, and habits of the user.

32. The method of claim 27, wherein the demographic information include information extrapolated from the user's past practices which indicate probable future actions consistent with the past practices.

33. The method of claim 27, further comprising:

the portable computing device transmitting an inquiry requiring a response to said one of said APs;

wherein the information provider transmits said information in response to said inquiry.

34. The method of claim 27, further comprising:

the portable computing device transmitting a message indicating presence of said portable computing device within an area monitored by said one of said APs;

the information provider determining if a service is required upon detection of said message; and the information provider initiating provision of said service in response to the information provider determining that a service is required.

35. The method of claim 27, wherein said information comprises travel itinerary information.

36. The method of claim 27, wherein said information comprises a nearest location of a service provider relative to said one of said APs.

37. The method of claim 27, wherein said information comprises promotion information;

wherein said one of said APs is located closely to a first provider of goods or services;

wherein said promotion information comprise promotions of said first provider of goods or services.

38. The method of claim 27, wherein said information comprises advertising information;

wherein said one of said APs is located closely to a first provider of goods or services;

wherein said advertising information comprises advertising of said first provider of goods or services.

39. A method of using geographic information to service mobile users who are in a vicinity of a plurality of APs, the method comprising:

(a) detecting the presence of a portable computing device in the vicinity of one of said APs;

(b) providing a location of the portable computing device after said detecting;

(c) providing identification information indicating a user of the portable computing device after said detecting;

(d) a information provider transmitting information to the portable computing device through said one of said APs, wherein a content of the information is dependent upon the location of the portable computing device and demographic information of the user of the portable computing device.

40. The method of claim 39, wherein the location of the portable computing device comprises the location of said one of said APs.

41. The method of claim 39, further comprising:

the information provider selecting said information based upon the location of the portable computing device and the demographic information of the user of the portable computing device, wherein said selecting is performed prior to said transmitting.

42. A carrier medium for carrying signals in a geographic-based network system, wherein the carrier medium is operable to carry:

identification information indicating a user of a portable computing device;

a known geographic location of the portable computing device as indicated by a first access point in the geographic-based network system communicating with the portable computing device; and information which is provided to the portable computing device, wherein the information is dependent upon the known geographic location of the portable computing device and demographic information of the user of the portable computing device.

43. The carrier medium of claim 42, wherein said information comprises promotion information;

wherein the promotion information comprises promotions of one or more providers of goods or services proximate to the known geographic location of the portable computing device.

44. The carrier medium of claim 42, wherein the information comprises travel itinerary information.

45. The carrier medium of claim 42, wherein the information comprises a nearest location of a service provider relative to the known geographic location of the portable computing device.

46. The carrier medium of claim 42, wherein the carrier medium carries wireless signals.

47. A geographic-based network system, comprising:

a plurality of access points operable to be coupled to a network and arranged at known locations in a geographic region, wherein each of the plurality of access points is configured to detect a portable computing device, wherein each of the plurality of access points is also configured to receive identification information indicating a user of a portable computing device, wherein, after detection of a portable computing device by a first access point of the plurality of access points in proximity to the portable computing device, and after receipt of the identification information indicating the user of the portable computing device, the first access point transmits information to the portable computing device, wherein the information is dependent upon a known location of the first access point and demographic information of the user of the portable computing device.

48. A geographic-based network system, comprising:

a plurality of access points coupled to said network and operable to be arranged at known locations in a geographic region, wherein a first access point of said plurality of access points in proximity to a portable computing device is operable to communicate with the portable computing device in a wireless fashion, wherein the first access point is operable to receive identification information associated with the portable computing device, wherein, after receipt of the identification information, demographic information of the user of the portable computing device is identified, and said first access point is operable to transmit information to said portable computing device, wherein a content of said information is dependent upon a known location of said first access point and the demographic information of the user of the portable computing device.

49. A geographic-based system, comprising:

an access point coupled to a network and operable to be arranged at a known location in a geographic region, wherein the access point is operable to communicate with a portable computing device in a wireless fashion when the access point is in proximity to the portable computing device, wherein the access point is operable to receive identification information associated with the portable computing device, wherein, after receipt of the identification information, demographic information of the user of the portable computing device is identified, and the access point is operable to transmit information to the portable computing device, wherein a content of said information is dependent upon a known location of the access point and the demographic information of the user of the portable computing device.

* * * * *

UNITED STATES PATENT AND TRADEMARK OFFICE
CERTIFICATE OF CORRECTION

| | |
|---|---|
| PATENT NO. | : 6,259,405 B1 |
| DATED | : July 10, 2001 |
| INVENTOR(S) | : Brett B. Stewart and James Thompson |

It is certified that error appears in the above-identified patent and that said Letters Patent is hereby corrected as shown below:

<u>Column 36, claim 49,</u>
Line 24, please delete "the user" and substitute -- a user --.

Signed and Sealed this

Twelfth Day of March, 2002

*Attest:*

JAMES E. ROGAN
*Attesting Officer*   *Director of the United States Patent and Trademark Office*